United States Patent
Matsushita

(10) Patent No.: US 7,980,635 B2
(45) Date of Patent: Jul. 19, 2011

(54) AUXILIARY MECHANISM FOR SEAT BELT APPARATUS

(75) Inventor: Yukihiro Matsushita, Hamamatsu (JP)

(73) Assignee: Asmo Co., Ltd. (JP)

( * ) Notice: Subject to any disclaimer, the term of this patent is extended or adjusted under 35 U.S.C. 154(b) by 183 days.

(21) Appl. No.: 12/465,860

(22) Filed: May 14, 2009

(65) Prior Publication Data

US 2009/0322141 A1    Dec. 31, 2009

(30) Foreign Application Priority Data

May 15, 2008 (JP) ................. 2008-128491
Nov. 27, 2008 (JP) ................. 2008-302608
Mar. 17, 2009 (JP) ................. 2009-065081

(51) Int. Cl.
*B60R 22/20* (2006.01)

(52) U.S. Cl. ................. 297/483; 297/481; 280/801.1; 280/808

(58) Field of Classification Search .......... 297/481, 297/483, 484; 280/801.1, 802, 808
See application file for complete search history.

(56) References Cited

U.S. PATENT DOCUMENTS

| | | | | |
|---|---|---|---|---|
| 4,084,841 A | * | 4/1978 | Hayashi et al. | 280/802 |
| 4,629,214 A | * | 12/1986 | Fohl | 280/808 |
| 4,775,167 A | * | 10/1988 | Schiller et al. | 280/808 |
| 4,919,488 A | * | 4/1990 | Deegener et al. | 297/468 |
| 4,993,748 A | * | 2/1991 | Jambor et al. | 280/808 |
| 5,431,446 A | * | 7/1995 | Czarnecki et al. | 280/802 |
| 5,505,491 A | * | 4/1996 | Townsend | 280/801.1 |
| 5,934,759 A | | 8/1999 | Paschek et al. | |
| 6,267,409 B1 | * | 7/2001 | Townsend et al. | 280/801.1 |
| 7,784,867 B2 | * | 8/2010 | Lamparter | 297/233 |

FOREIGN PATENT DOCUMENTS

| | | |
|---|---|---|
| DE | 10314464 A1 | 10/2004 |
| DE | 60103405 T2 | 6/2005 |
| DE | 102006056532 A1 | 5/2008 |
| JP | 05-112204 A | 5/1993 |
| JP | 05-301560 A | 11/1993 |
| JP | 06-072285 A | 3/1994 |
| JP | 10-217908 A | 8/1998 |
| JP | 2002-249021 A | 9/2002 |
| JP | 2004-299657 A | 10/2004 |
| JP | 2006-117008 A | 5/2006 |
| JP | 2007-030528 A | 2/2007 |
| JP | 2007-045189 A | 2/2007 |
| JP | 2008-143279 A | 6/2008 |
| WO | 2008/065064 A1 | 6/2008 |

\* cited by examiner

*Primary Examiner* — Peter R. Brown

(74) *Attorney, Agent, or Firm* — Akerman Senterfitt

(57) ABSTRACT

An auxiliary mechanism for a seat belt apparatus includes a support portion and a guide portion. The support portion supports a webbing in a manner drawable to the front of a seat back. The support portion is movable between a storage position, which is near the seat back, and a projection position, which is spaced further apart from the seat back than the storage position to draw out the webbing toward the front of the seat back. The guide portion guides the movement of the support portion between the storage position and the projection position, and then continuously guides the movement of the support portion along a vertical direction of the seat back at the storage position.

26 Claims, 15 Drawing Sheets

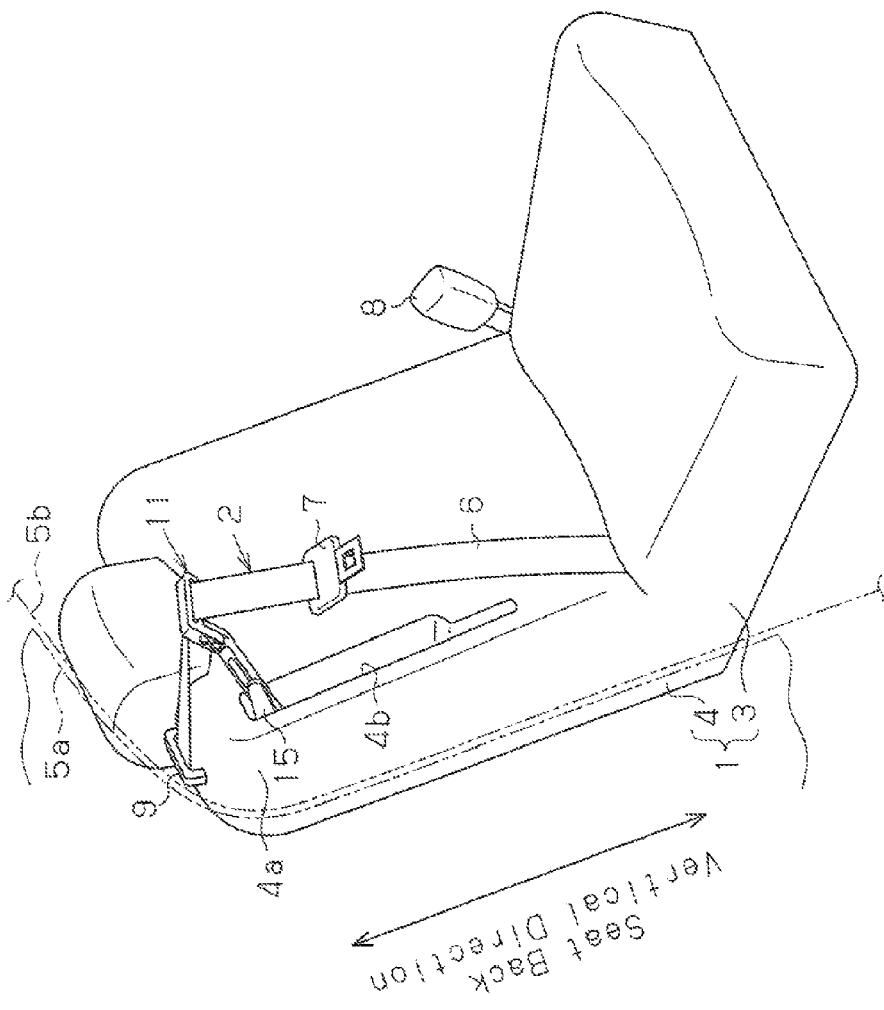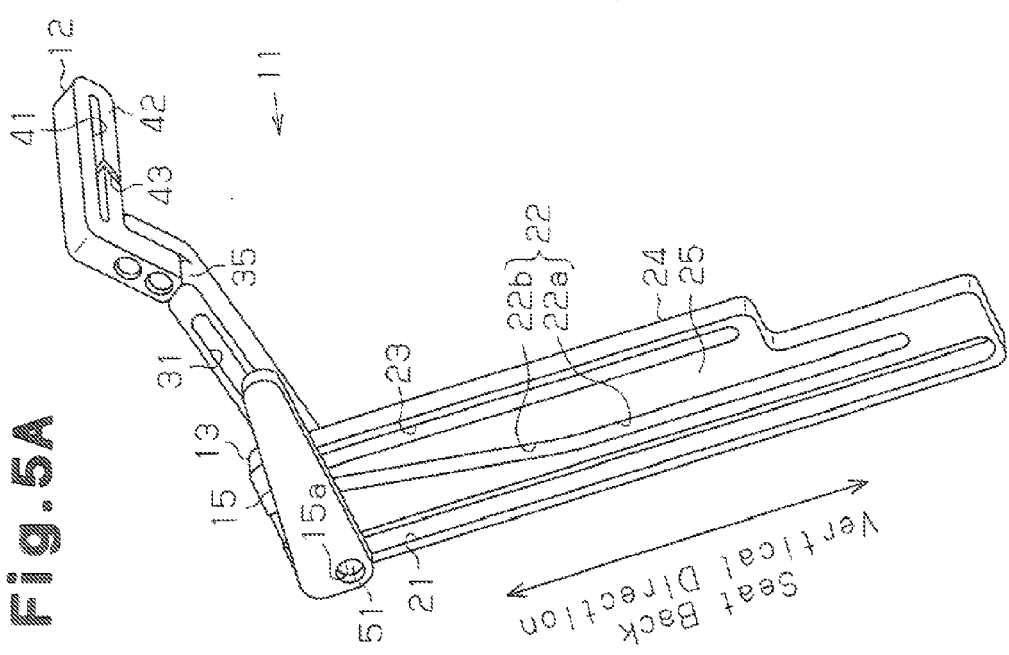

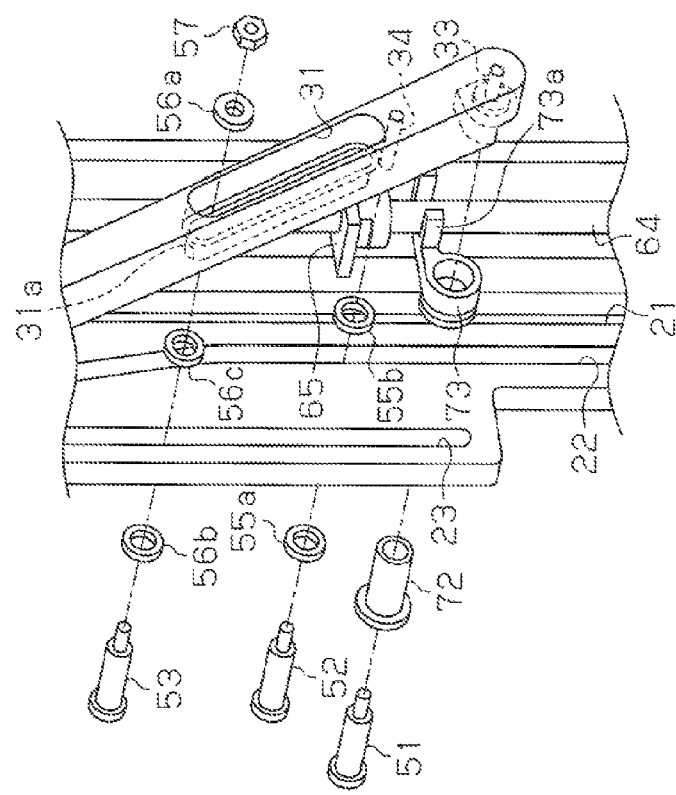
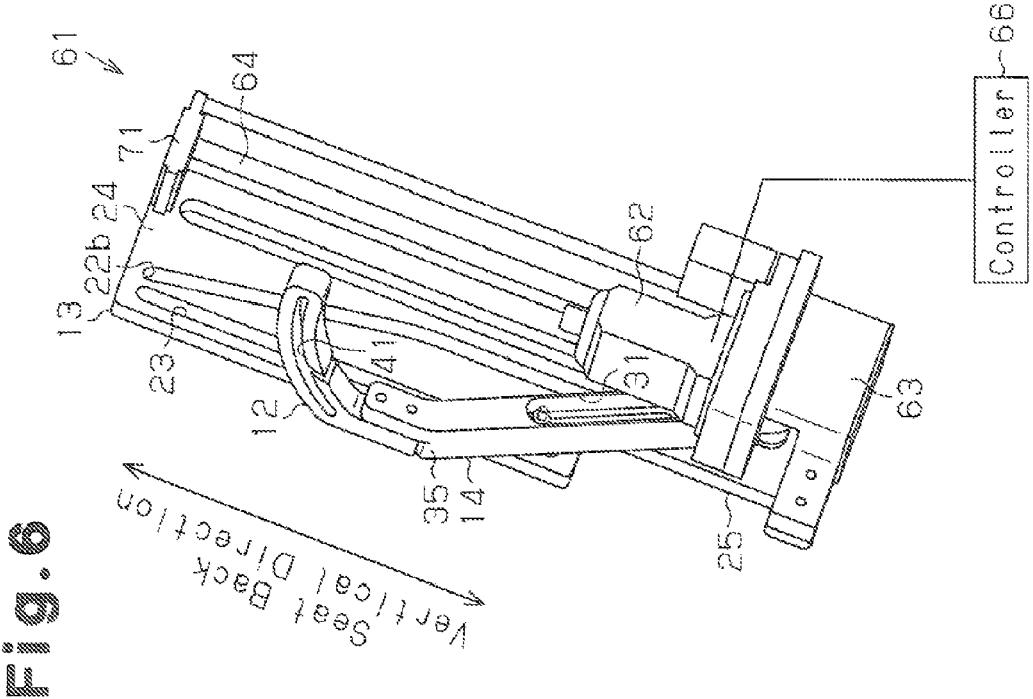

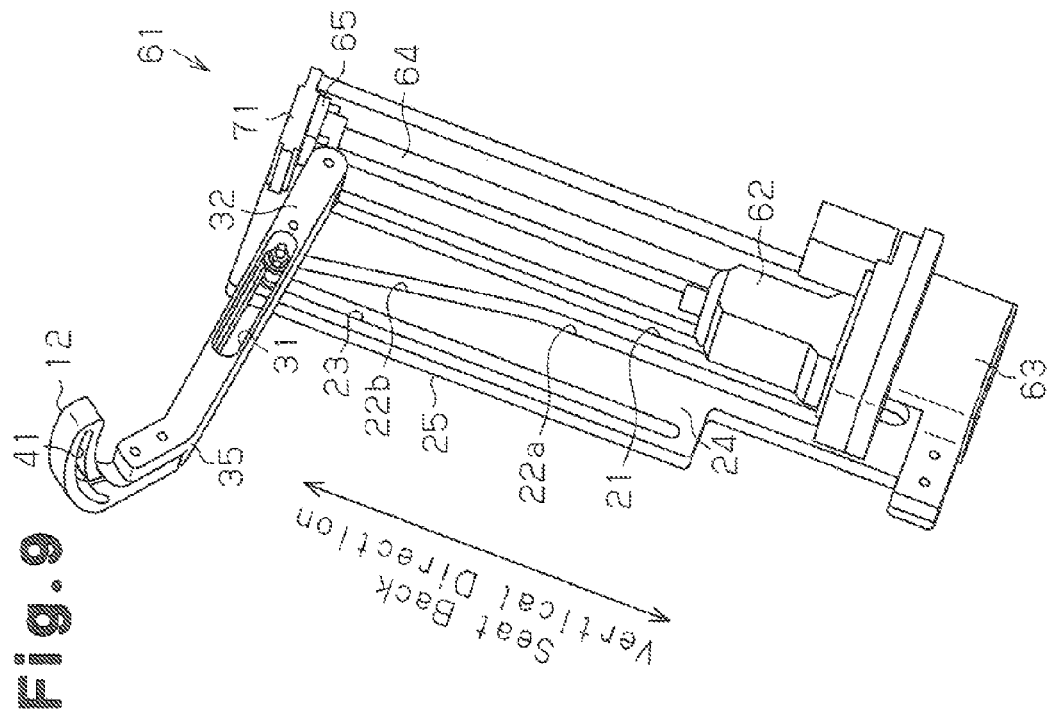
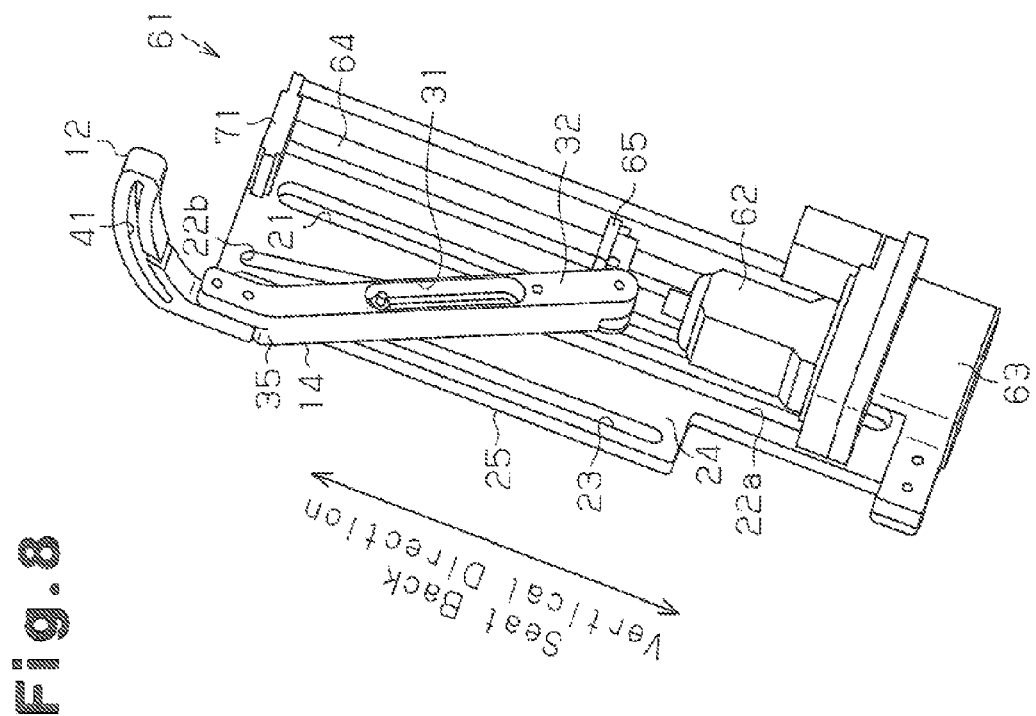

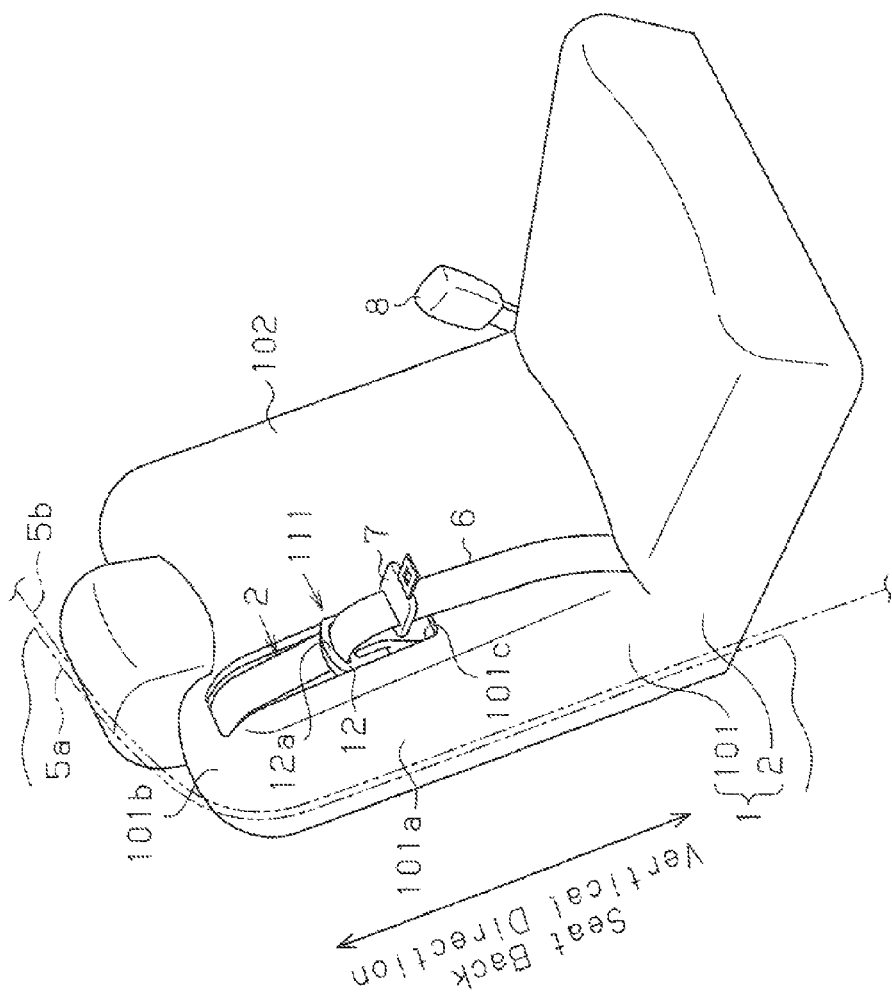

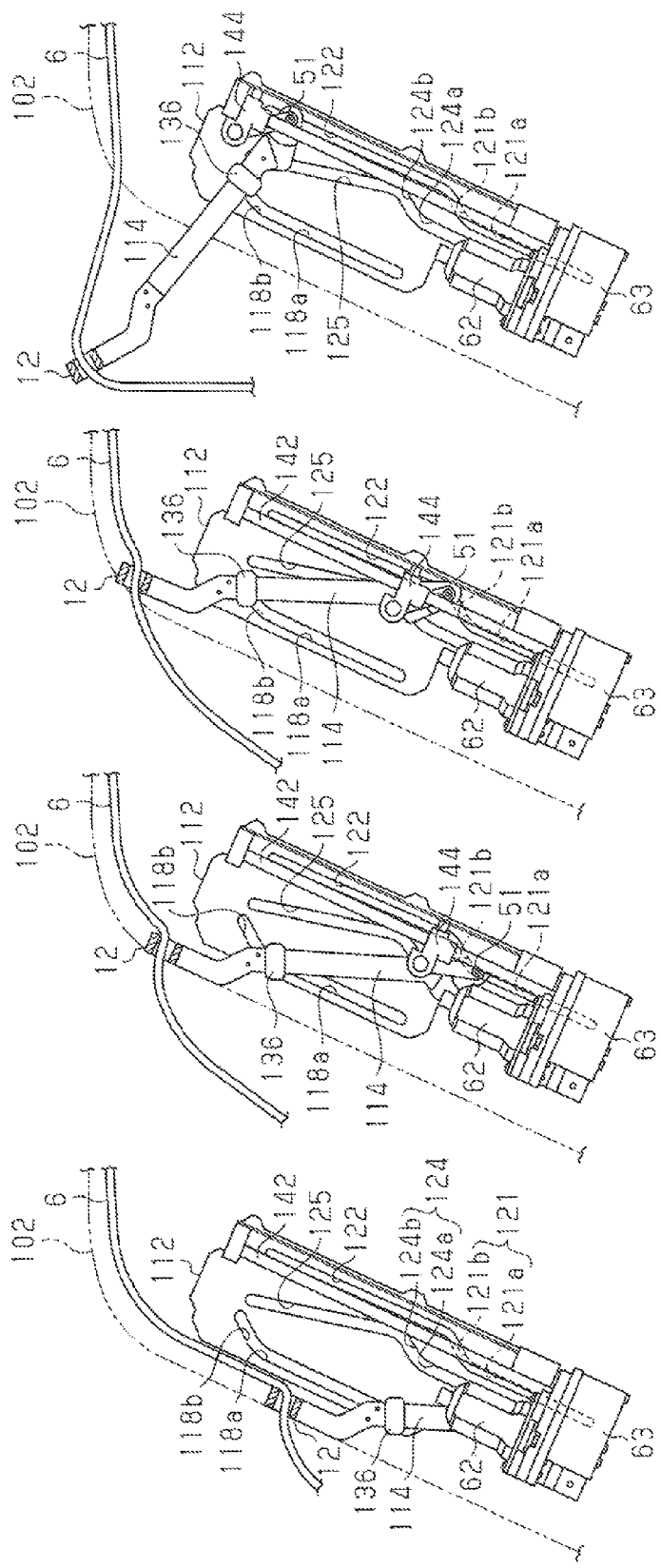

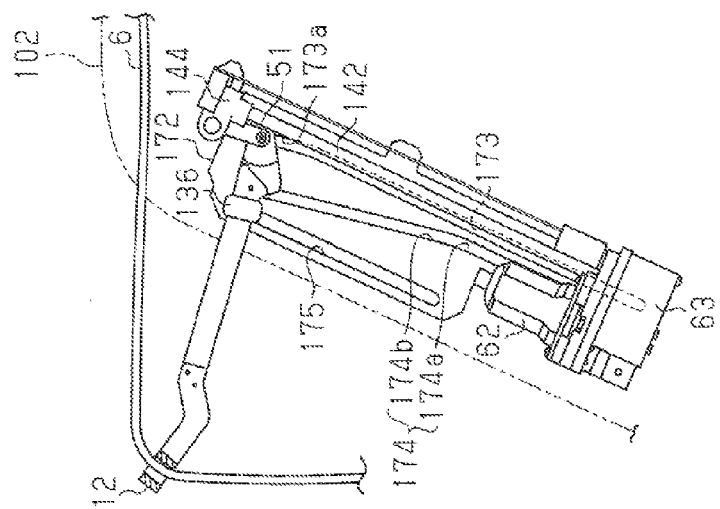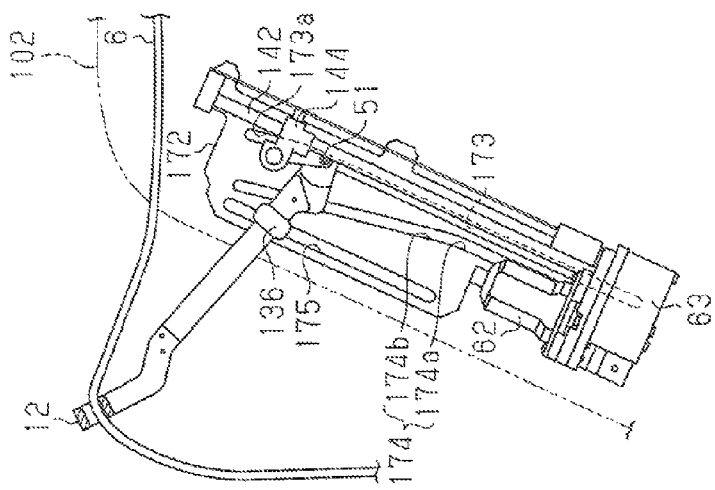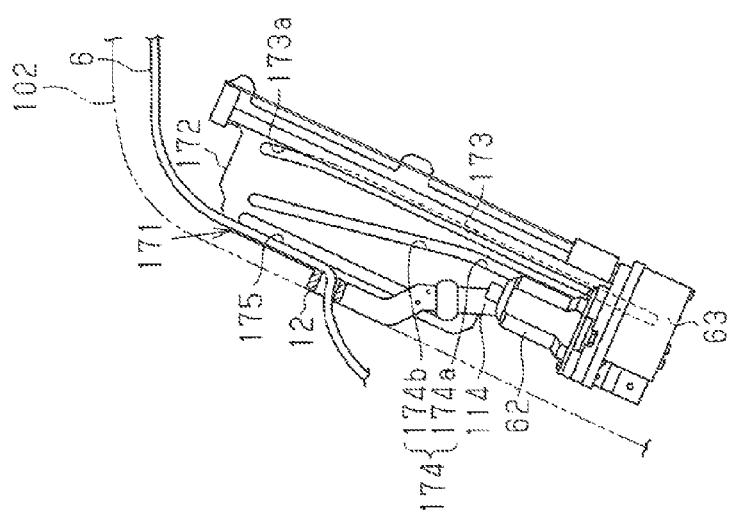

AUXILIARY MECHANISM FOR SEAT BELT APPARATUS

BACKGROUND OF THE INVENTION

The present invention relates to an auxiliary mechanism for a three-point seat belt apparatus, and more particularly, to an auxiliary mechanism that aids a passenger when fastening a webbing of the seat belt apparatus and adjusts a webbing support position on an upper side of a seat back.

In the prior art, a seat belt apparatus includes a belt-like webbing, a tongue plate, and a buckle. In a vehicle seat having a seat back, the webbing is drawn from the upper side of the seat back to restrain the passenger seated on the seat. The tongue plate is arranged on the webbing so as to be movable along a longitudinal direction of the webbing. The tongue plate is engaged with the buckle. This type of a seat belt apparatus becomes fixed at three points when the passenger engages the tongue plate with the buckle. The webbing restrains the passenger's upper body from the shoulders to a diagonally lower portion in addition to restraining the passenger's waist.

When fastening this type of seat belt apparatus, the passenger who is seated on the vehicle seat must twist his or her upper body to grasp the webbing. Therefore, the webbing is not easy to fasten. In particular, for a rear seat, the webbing is held in close contact with the front surface of a seat back. Thus, it is difficult to grasp the webbing and difficult to fasten the seat belt apparatus.

Accordingly, Japanese Laid-Open Patent Publication No. 2007-45189 discloses a seat belt fastening auxiliary apparatus including a grasping unit arranged at a distal end of a fastening auxiliary arm and used to grasp the webbing. In the auxiliary apparatus, the fastening auxiliary arm is pivoted when fastening the seat belt apparatus so as to move the grasping unit toward the front of the seat back. This moves the webbing together with the grasping unit toward the front of the seat back so that the passenger can easily grasp the webbing.

In the above-described publication, the webbing is drawn out of a through-anchor located on one side at an upper end of the seat back. The webbing is extended from the position of the through-anchor to the position of the buckle to restrain the upper body of the passenger. In this manner, the position of the through-anchor is fixed. Thus, the webbing, which should be drawn out from a desired position above the shoulder of the passenger, may be located at a position that is too high or too low. Since passengers have different physical frames, preferable fastening may not be possible for each passenger.

SUMMARY OF THE INVENTION

It is an object of the invention is to provide an auxiliary mechanism that aids a passenger when fastening a seat belt apparatus and adjusts a webbing support position on an upper side of a seat back.

To achieve the above, one aspect of the present invention provides an auxiliary mechanism for a seat belt apparatus including a belt-like webbing, which is drawn out from near an upper portion of a seat back of a vehicle seat so as to restrain a passenger seated on the vehicle seat, a tongue plate, which is arranged on the webbing so as to be movable along a longitudinal direction of the webbing, and a buckle, which is engaged with the tongue plate. The auxiliary mechanism includes a support portion which supports the webbing above the tongue plate so that the webbing is drawable toward the front of the seat back along a longitudinal direction of the webbing. The support portion is movable between a storage position located near the seat back and a projection position spaced further apart from the seat back than the storage position to draw out the webbing toward the front of the seat back. A guide portion guides the movement of the support portion between the storage position and the projection position and then continuously guides the movement of the support portion along a vertical direction of the seat back at the storage position.

Other aspects and advantages of the present invention will become apparent from the following description, taken in conjunction with the accompanying drawings, illustrating by way of example the principles of the invention.

BRIEF DESCRIPTION OF THE DRAWINGS

The novel features of the present invention will become apparent from the appended claims. The invention, together with objects and advantages thereof, may best be understood by reference to the following description of the presently preferred embodiments together with the accompanying drawings in which:

FIG. 5A is a perspective view illustrating the auxiliary mechanism of FIG. 1 located at a projection position;

FIG. 5B is a perspective view illustrating the vehicle seat including the auxiliary mechanism of FIG. 5A;

FIG. 6 is a perspective view illustrating an auxiliary mechanism according to a second embodiment of the present invention located at the adjustment lower limit position;

FIG. 7 is a partially exploded perspective view illustrating the auxiliary mechanism of FIG. 6;

FIG. 8 is a perspective view illustrating the auxiliary mechanism of FIG. 6 located at the adjustment upper limit position;

FIG. 9 is a perspective view illustrating the auxiliary mechanism of FIG. 6 located at the projection position;

FIG. 13 is a perspective view illustrating a vehicle seat including an auxiliary mechanism according to a third embodiment of the present invention located at the adjustment lower limit position;

FIG. 14 is a perspective view illustrating the auxiliary mechanism of FIG. 13 located at the adjustment upper limit position;

FIGS. 16A to 16D are views illustrating the operation of the auxiliary mechanism of FIG. 13;

FIG. 17 is a side view illustrating an auxiliary mechanism according to a fourth embodiment of the present invention;

FIGS. 18A and 18B are views illustrating the operation of the auxiliary mechanism of FIG. 17;

DETAILED DESCRIPTION OF THE PREFERRED EMBODIMENTS

A first embodiment of the present invention will now be discussed with reference to FIGS. 1 to 5.

Figure 1:
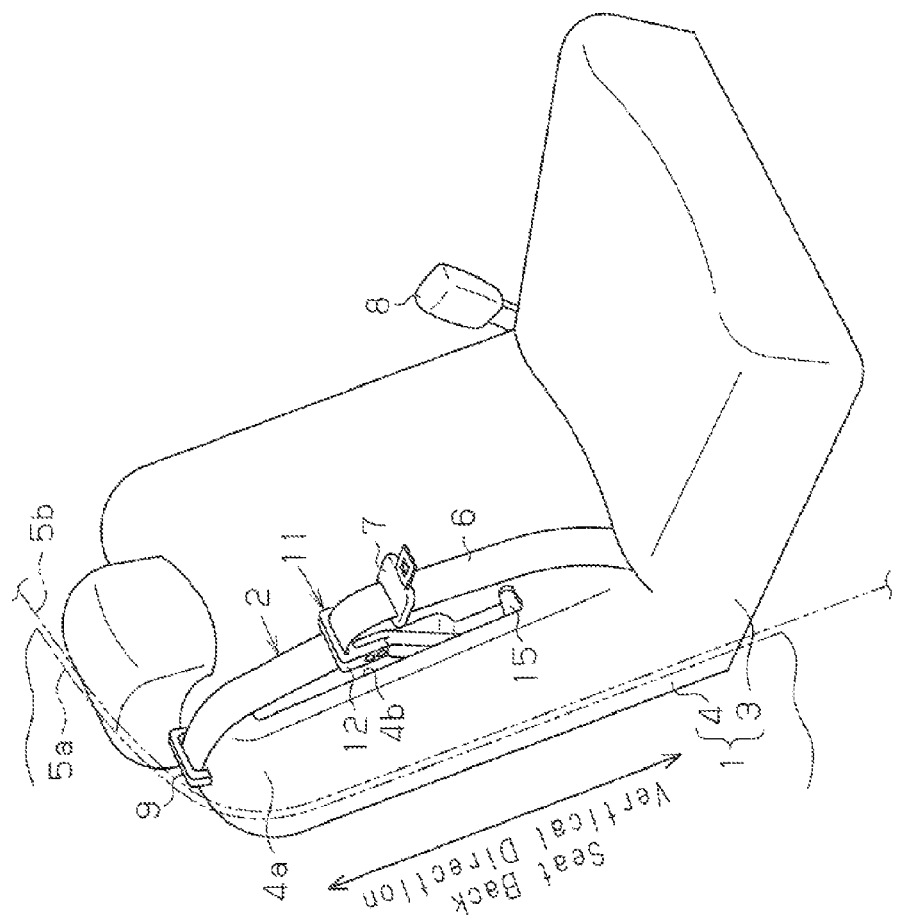
FIG. 1 is a perspective view illustrating a vehicle seat including an auxiliary mechanism according to a first embodiment of the present invention located at an adjustment lower limit position.

As illustrated in FIG. 1, a vehicle seat 1, on which a passenger sits, and a seat belt apparatus 2, which restrains the passenger who is seated on the vehicle seat 1, are arranged in the passenger compartment of a vehicle. In this embodiment, the vehicle seat 1 is a rear seat of the vehicle, and the vehicle seat 1 includes a seat cushion 3, on which the passenger sits, and a seat back 4, which projects from the rear end of the seat cushion 3 to hold the passenger in the seated position. An auxiliary mechanism 11 is incorporated in the seat back 4. The auxiliary mechanism 11 is partially exposed from an accommodation portion 4b, which is formed toward a sidewall 5a of the passenger compartment in an upper portion 4a of the seat back 4.

The seat belt apparatus 2 includes a belt-like webbing 6, a tongue plate 7, and a buckle 8. The webbing 6 is drawn out of the upper end of the seat back 4 near the sidewall 5a to restrain the passenger. The tongue plate 7 is arranged on the webbing 6 so as to be movable along a longitudinal direction of the webbing 6. The buckle 8, which is engaged with the tongue plate 7, is arranged at the side of the seat cushion 3 opposite to the side closer to the sidewall 5a. In the first embodiment, a through-anchor 9 is arranged on the upper end of the seat back 4 near the sidewall 5a and toward the rear of the seat back 4. The webbing 6 has a basal end wound into a winding device (not illustrated), such as an Emergency Locking Retractor (ELR), which is located behind the vehicle seat 1. The webbing 6 has a distal end inserted through the through-anchor 9 and fixed to the rearward surface of the seat cushion 3 near the sidewall 5a of the passenger compartment. That is, a three-point seat belt apparatus is formed by fixing the distal end and basal end of the webbing 6 and engaging the tongue plate 7 with the buckle 8 in the seat belt apparatus 2. The webbing 6 restrains not only the upper body of the passenger from the shoulders to a diagonally lower portion but also the passenger's waist. Since the basal end of the webbing 6 is wound onto the winding device, the webbing 6 has a length that comes into conformance with the physical frame of the passenger.

The auxiliary mechanism 11 will now be discussed.

Figure 2:
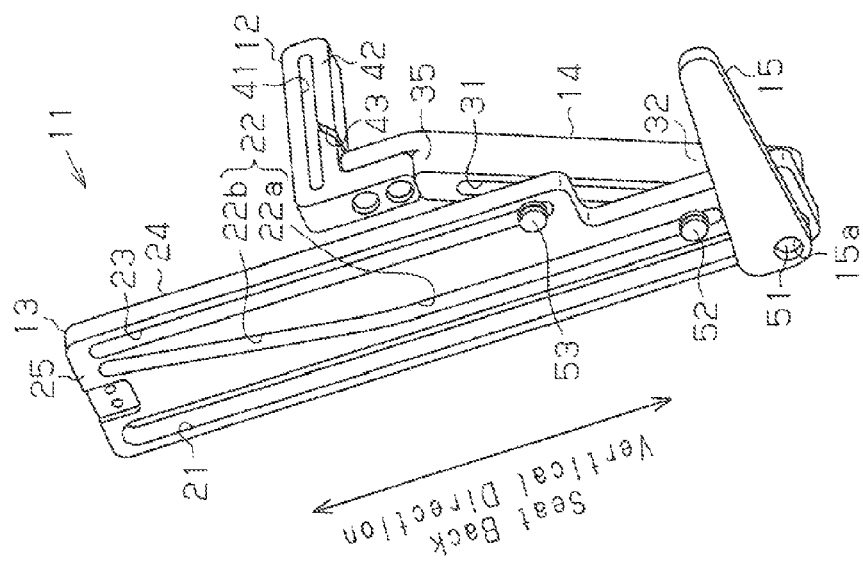
FIG. 2 is a perspective view illustrating the auxiliary mechanism of FIG. 1.
Figure 3:
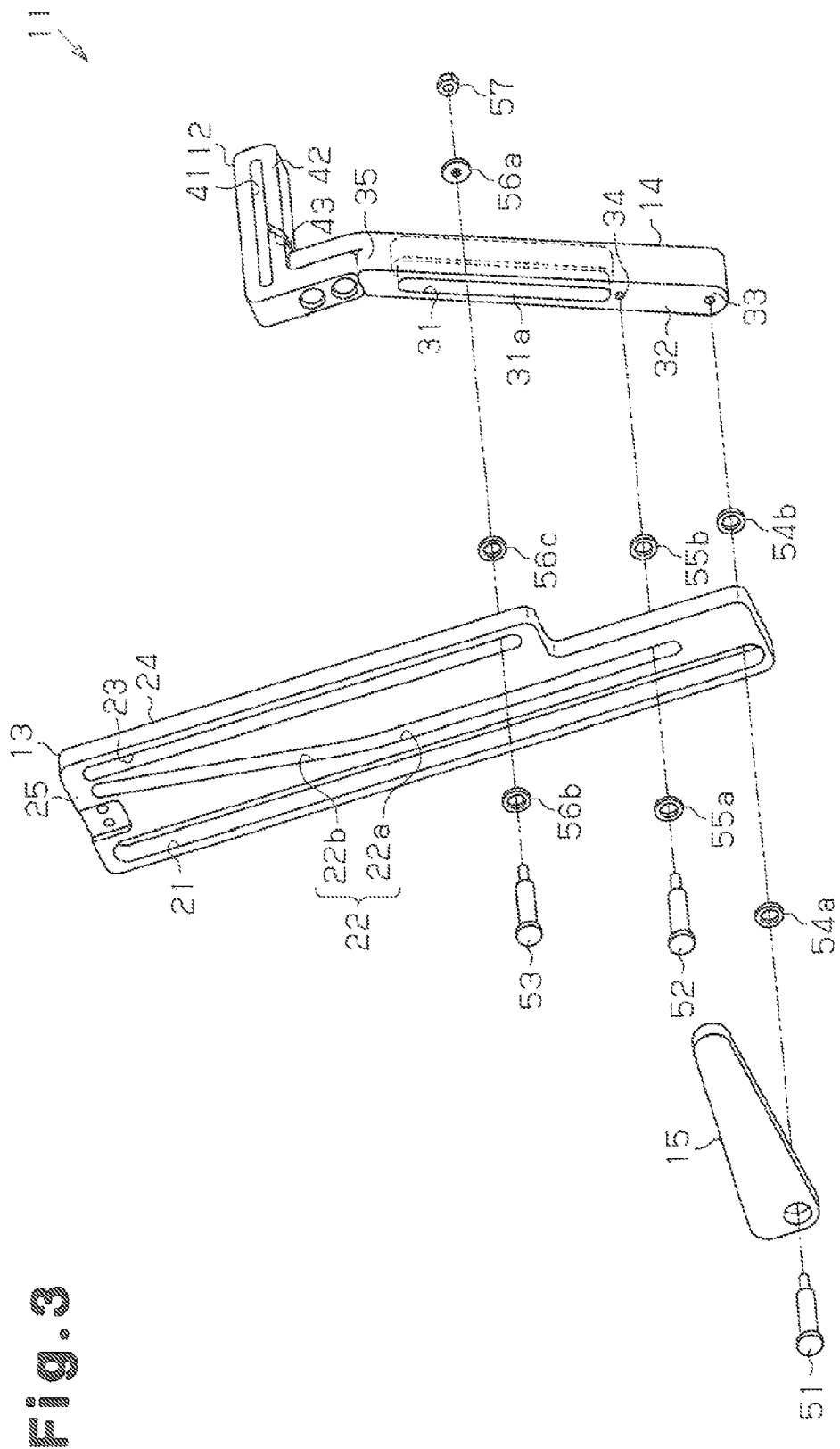
FIG. 3 is an exploded perspective view illustrating the auxiliary mechanism of FIG. 2.

As illustrated in FIGS. 2 and 3, the auxiliary mechanism 11 includes a support member 12, which supports the webbing 6 (basal end side) above the tongue plate 7 in the webbing 6. The support member 12 allows the webbing 6 to be drawn out toward the front of the seat back 4 and is movable along the longitudinal direction of the webbing 6. That is, the webbing 6 drawn out of the through-anchor 9 is supported by the support member 12 to extend to the buckle 8 and restrain the upper body of the passenger. The auxiliary mechanism 11 performs an assistance operation in which the support member 12 is moved away from a storage position, in which the support member 12 is located in the vicinity of the seat back 4, to a projection position, in which the support member 12 is spaced apart from the seat back 4 so as to draw out the webbing 6 toward the front of the seat back 4. The auxiliary mechanism 11 also performs an adjustment operation in which the support member 12 is moved at the storage position in a vertical direction of the seat back 4 to change the support position of the webbing 6 at the upper portion 9a of the seat back 4. The auxiliary mechanism 11 guides the movement of the support member 12 in the assistance operation and then continuously guides the movement of the support member 12 in the adjustment operation.

More particularly, the auxiliary mechanism 11 includes a rectangular planar guide plate 13, an angle 14, and a lever 15. The guide plate 13 is fixed to the inside of the seat back 4 and serves as a guide portion. The angle 14 is coupled to the guide plate 13 so as to be movable relative to the guide plate 13. The lever 15 is arranged on the angle 14 so as to be integrally movable with the angle 14. The support member 12 is fixed to a distal portion 35 of the angle 14. The support member 12 and the angle 14 form a support portion.

The guide plate 13 is fixed toward a side surface in the seat back 4 so that the longitudinal direction of the guide plate 13 is matched with the vertical direction of the seat back 4 and the lateral direction of the guide plate 13 is matched with a forward-rearward direction of the seat back 4. Accordingly, although part of the guide plate 13 is arranged near the backrest surface of the seat back 4, the backrest feel of the passenger is subtly affected because the guide plate 13 is located away from the passenger in the seat back 4. Hereinafter, the longitudinal direction of the guide plate 13 is referred to as the vertical direction, and the lateral direction of the guide plate 13 is referred to as forward-rearward direction.

The guide plate 13 includes an actuation groove 21 serving as an actuation guide portion, an intermediate groove 22 serving as an intermediate guide portion, and an action groove 23 serving as an action guide portion are formed in the guide plate 13. The actuation groove 21, the intermediate groove 22, and the action groove 23 extend parallel to one another in the forward-rearward direction. Specifically the actuation groove 21 is formed to extend straight in the vertical direction. The intermediate groove 22 is spaced from the actuation groove 21 by a predetermined distance in the forward-rearward direction (the lateral direction of the actuation groove 21). The intermediate groove 22 includes a parallel portion 22a and an inclined portion 22b. The parallel portion 22a, which extends parallel to the actuation groove 21, is shorter than the actuation groove 21. The inclined portion 22b, which extends continuously from the parallel portion 22a, serves as a nonparallel portion that is inclined in the longitudinal direction of the intermediate groove 22 so as to be spaced apart from the actuation groove 21. The action groove 23 is formed to be parallel to the actuation groove 21, with the intermediate groove 22 being located between the action groove 23 and the actuation groove 21. The actuation groove 21, the intermediate groove 22, and the action groove 23 extend through the guide plate 13 in the plate thicknesswise direction.

The angle 14 has generally elongated quadrangular prism shape. An elongated hole, or slit 31, extends in an axial direction of the angle 14 and through a central part of the angle 14 in a thicknesswise direction of the guide plate 13. In the slit 31 at the portion located closer to the guide plate 13 from the middle of the slit 31 in the thicknesswise direction, an extended portion 31a is formed along the entire periphery of the slit 31 so as to extend into the slit 31 (see FIG. 3). In other words, the extended portion 31a is a region where the slit 31 is reduced in size. The angle 14 has an actuation pin hole 33 formed at a basal portion 32 and an intermediate pin hole 34 formed toward a distal portion 35 at a location separated from the actuation pin hole 33 in the axial direction of the angle 14 by a distance greater than a predetermined distance (the distance in the forward-rearward direction between the actuation groove 21 and the parallel portion 22a). Specifically, a maximum distance in the forward-rearward direction between the actuation groove 21 and the inclined portion 22b, that is, the distance in the forward-rearward direction at the upper side of the guide plate 13 is provided between the actuation pin hole 33 and the intermediate pin hole 34. The support member 12 is fixed to the distal portion 35 of the angle 14.

The support member 12 is formed to have the shape of a square frame and includes an insertion hole 41. The insertion hole 41 extends in the forward-rearward direction of the seat back 4 in a state in which the support member 12 is located in the storage position. The insertion hole 41 is elongated to be larger than the width of the webbing 6 and the thickness of the webbing 6. The support member 12 includes a wall portion 42 formed to be located in the thicknesswise direction of the webbing 6. An inlet 43 extends through the wall portion 42 in the thicknesswise direction and longitudinal direction of the webbing 6 (the vertical direction and the forward-rearward direction of the seat back 4) with a width greater than the thickness of the webbing 6. The support member 12 supports the webbing 6, which is inserted into the insertion hole 41 through the inlet 43, so that the webbing 6 can be drawn out frontward from the seat back 4 and so that it is movable in the longitudinal direction of the webbing 6.

The lever 15 is a triangular plate. An attachment hole 15a extends through the basal side of the lever 15 in the thicknesswise direction of the guide plate 13. The lever 15 has a distal end exposed from the front surface of the seat back 4 so that the passenger, when seated on the vehicle seat 1, can grasp the lever 15.

The angle 14 is arranged near an inner mounting surface 24 of the guide plate 13, and the lever 15 is arranged near a side surface 25 of the guide plate 13 on the opposite side of the mounting surface 24. The guide plate 13, the angle 14, and the lever 15 are coupled to one another by an actuation pin 51, an intermediate pin 52, and an action pin 53, which are respectively inserted into the actuation groove 21, the intermediate groove 22, and the action groove 23. The actuation pin 51, the intermediate pin 52, and the action pin 53 are movable in the longitudinal direction in the actuation groove 21, the intermediate groove 22, and the action groove 23, respectively.

Specifically, as illustrated in FIG. 3, the actuation pin 51 is inserted into the attachment hole 15a of the lever 15 and the actuation groove 21 so as to be fastened with the actuation pin hole 33 of the angle 14. This couples the guide plate 13, the angle 14, and the lever 15 to one another. A washer 54a is interposed between the lever 15 and the guide plate 13, and a washer 54b is interposed between the guide plate 13 and the angle 14. The intermediate pin 52 is inserted into the intermediate groove 22 and fastened to the intermediate pin hole 34 of the angle 14. This couples the guide plate 13 and the angle 14 to each other. A washer 55a is interposed between the intermediate pin 52 and the guide plate 13, and a washer 55b is interposed between the guide plate 13 and the angle 14. The action pin 53 is inserted into the action groove 23, and a nut 57 is fastened to a distal portion of the action pin 53 with a washer 56a arranged in between. This couples the guide plate 13 and the angle 14 to each other. The washer 56a and the nut 57 are located on the side opposite to the extended portion 31a and farther from the guide plate 13. A washer 56b is interposed between the action pin 53 and the guide plate 13, and a washer 56c is interposed between the guide plate 13 and the angle 14. Accordingly, the actuation pin 51 integrally moves the angle 14 and the lever 15. Further, the actuation pin 51, the intermediate pin 52, and the action pin 53 are moved in the actuation groove 21, the intermediate groove 22, and the action groove 23 so as to move the angle 14 and the lever 15 relative to the guide plate 13. In the first embodiment, the slit 31 and the action pin 53 form a coupling portion.

The operation of the auxiliary mechanism 11 will now be discussed.

First, when the lever 15 (actuation pin 51) is located at the lower end of the actuation groove 21 as illustrated in the state of FIG. 2, the support member 12 is located below the upper end (at an adjustment lower limit position) of the seat back 4 as illustrated in the state of FIG. 1.

Figure 4B:
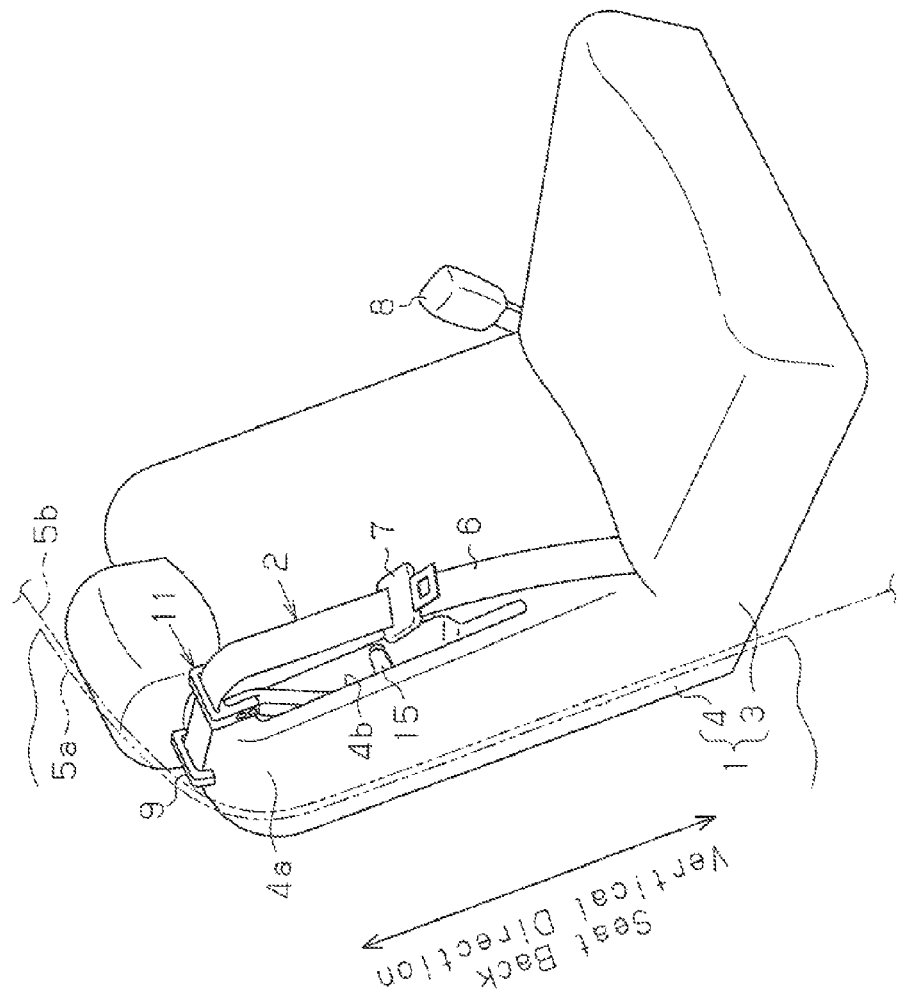
FIG. 4B is a perspective view illustrating the vehicle seat including the auxiliary mechanism of FIG. 4A.
Figure 4A:
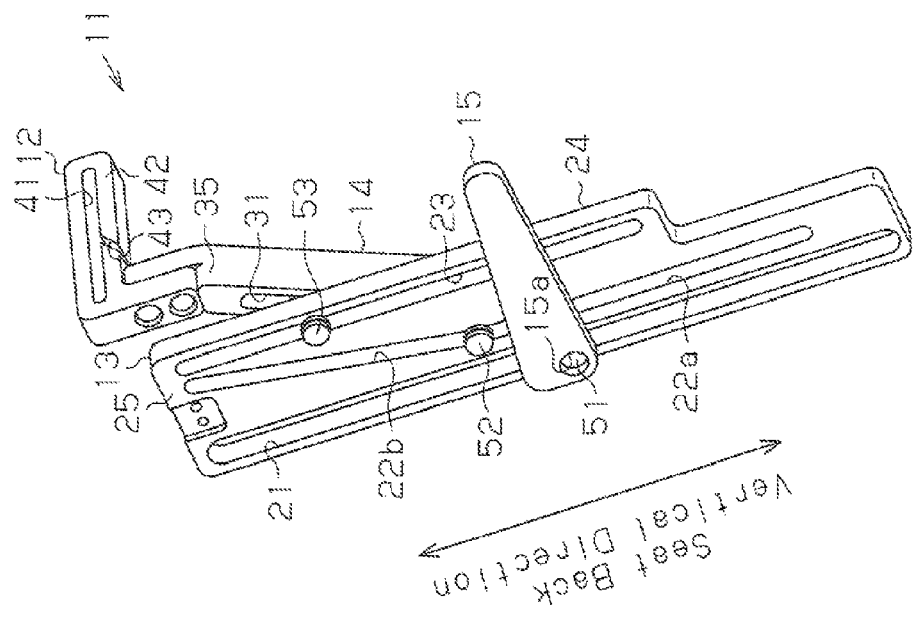
FIG. 4A is a perspective view illustrating the auxiliary mechanism of FIG. 1 located at an adjustment upper limit position.

When the passenger slides the lever 15 upward, as illustrated in the state of FIG. 4A, the actuation pin 51, the intermediate pin 52, and the action pin 53 are respectively moved in the actuation groove 21, the parallel portion 22a, and the action groove 23 until the intermediate pin 52 enters the inclined portion 22b of the intermediate groove 22. This moves the support member 12 and the angle 14 in parallel along the vertical direction of the seat back 4. That is, the guide plate 13 guides the movement of the support member 12 in the vertical direction of the seat back 4 at the storage position. FIG. 4A illustrates a state immediately before the intermediate pin 52 enters the inclined portion 22b. In this case, as illustrated in FIG. 4B, the support member 12 is located at the substantially upper end (at an adjustment upper limit position) of the seat back 4.

When further sliding the lever 15 upward from the adjustment upper limit position, the distance in the lateral direction between the actuation groove 21 and the intermediate groove 22 increases. Thus, as the actuation pin 51, the intermediate pin 52, and the action pin 53 respectively move in the actuation groove 21, the inclined portion 22b, and the action groove 23, the angle 14 is pivoted so that the support member 12 is arranged toward the front of the seat back 4. That is, the support member 12 is moved toward the front of the seat back 4, and the guide plate 13 guides the movement of the support member 12 between the storage position and the projection position. When the intermediate pin 52 moves in the inclined portion 22b, the action pin 53 moves in the slit 31 so as not to hinder the pivoting of the angle 14. When sliding the lever 15 (actuation pin 51) to the upper end of the actuation groove 21 as illustrated in the state of FIG. 5A, the support member 12 becomes arranged at a projection position as illustrated in the state of FIG. 5B.

Accordingly, when the passenger sits on the vehicle seat 1 and operates the lever 15 as illustrated in FIG. 5, the webbing 6 and the support member 12 are moved to the front of the seat back 4 so as to perform the assistance operation for aiding the fastening of the seat belt apparatus 2. This allows the passenger to easily grasp the webbing 6 and easily fasten the seat belt apparatus 2. Then, the lever 15 slid downward to return the support member 12 to the storage position as illustrated in the states of FIGS. 4A and 4B. Further, the adjustment operation is performed by operating the lever 15 to change the position in the vertical direction of the support member 12 relative to the seat back 4 and change the support position of the webbing 6 at the upper side of the seat back 4. Therefore, the webbing 6 is drawn from the desired position above the passenger's shoulders, and the seat belt apparatus 2 is fastened in a preferable manner in conformance with the passenger's physical frame to ensure protection of the passenger. Accordingly, when the passenger moves the lever 15 in the vertical direction, the guide plate 13 guides the movement of the support member 12 between the storage position and the projection position and then continuously guides the movement of the support member 12 at the storage position in the vertical direction of the seat back 4.

The auxiliary mechanism 11 is incorporated in the seat back 4. Thus, when the seat back 4 is reclined with respect to the seat cushion 3, the auxiliary mechanism 11 is moved integrally with the seat back 4. Therefore, when fastening the seat belt apparatus 2, the assistance operation is performed in a preferable manner in accordance with the reclining (state) of the seat back 4, that is, in accordance with the passenger's body and seating position.

This embodiment has the advantages described below.

(1) The auxiliary mechanism 11 of the seat belt apparatus 2 includes the support member 12 and the guide plate 13. The support member 12 supports the webbing 6 above the tongue plate 7 to allow the webbing 6 to be drawn out toward the front of the seat back 4. The support member 12 is movable between the storage position and the projection position along the longitudinal direction of the webbing 6. The guide plate 13 guides the movement of the support member 12 between the storage position and the projection position and then continuously guides the movement of the support member 12 in the vertical direction of the seat back 4 at the storage position. Therefore, at the projection position, the assistance operation is performed by moving the support member 12 and the webbing 6 toward the front of the seat back 4 so that the passenger can easily grasp the webbing 6. At the storage position, the adjustment operation is performed by moving the support member 12 in the vertical direction of the seat back 4 to change the support position of the webbing 6 at the upper side of the seat back 4 in conformance with the passenger's physical frame. Thus, the seat belt apparatus 2 is fastened in a preferable manner to ensure protection of the passenger. The guide plate 13 guides the movement of the support member 12 between the storage position and the projection position and then continuously guides the movement of the support member 12 in the vertical direction of the seat back 4 at the storage position. Thus, the assistance operation and the adjustment operation are performed with a structure that is simpler than when using separate mechanisms for performing the assistance operation and the adjustment operation.

(2) The guide plate 13 includes the straight actuation groove 21 and the intermediate groove 22, which includes the parallel portion 22a and the inclined portion 22b. The parallel portion 22a extends parallel to the actuation groove 21 and is spaced apart from the actuation groove 21 by the predetermined distance in the lateral direction of the guide plate 13, and the parallel portion 22a is shorter than the actuation groove 21. The inclined portion 22b extends continuously from the parallel portion 22a and is inclined in the longitudinal direction of the guide plate 13 so as to extend away from the actuation groove 21. The support member 12 is arranged at the distal portion 35 of the angle 14. The actuation pin 51 is engaged with the actuation groove 21 so as to be movable along the longitudinal direction of the actuation groove 21. The intermediate pin 52 is engaged with the intermediate groove 22 so as to be movable along the longitudinal direction of the intermediate groove 22. The actuation pin 51 and the intermediate pin 52 are fixed to the basal portion 32 of the angle 14 and spaced apart from each other by a distance that is greater than the predetermined distance. This couples the guide plate 13 and the angle 14 to each other. Therefore, the adjustment operation may be performed by moving the intermediate pin 52 in the parallel portion 22a, and the assistance operation may be performed by moving the intermediate pin 52 in the inclined portion 22b. This allows for the structure of the auxiliary mechanism 11 to be simplified.

(3) The guide plate 13 includes the action groove 23, which extends parallel to the actuation groove 21, and the intermediate groove 22, which is located between the action groove 23 and the actuation groove 21. The slit 31 is formed between the distal portion 35 and the basal portion 32 of the angle 14. The action pin 53, which is inserted into the action groove 23 and the slit 31 in a manner movable in the respective longitudinal directions, couples the guide plate 13 and the angle 14. Thus, when the action pin 53 moves in the slit 31 of the angle 14 as the intermediate pin 52 moves in the inclined portion 22b, the pivoting of the angle 14 is not hindered. This reduces the stress applied to the angle 14 (particularly, the basal portion 32 of the angle 14) and the guide plate 13 by the webbing 6 with the support member 12. Further, the angle 14 has generally elongated quadrangular prism shape. This allows for the angle to be reduced in size and weight while ensuring enough amount of movement for the webbing 6 toward the front of the seat back 4 during the assistance operation. Further, the action pin 53 is inserted into the slit 31, which is formed in the angle 14, and the action groove 23 to couple the guide plate 13 and the angle 14. This keeps the number of components low.

(4) The webbing 6 is inserted into and supported by the insertion hole 41 of the support member 12. This prevents separation of the webbing 6 from the support member 12 even if some kind of an external force is applied to the webbing 6 due to, for example, changes in the position of the passenger. Accordingly, protection of the passenger with the seat belt apparatus 2 is ensured while improving the reliability of the adjustment operation and assistance operation performed with the auxiliary mechanism 11.

(5) The inlet 43 extends through the wall portion 42 of the support member 12 in the thicknesswise direction and the longitudinal direction of the webbing 6. This allows for the webbing 6 to be inserted into the insertion hole 41 through the inlet 43. Thus, the webbing 6 may easily be supported by the support member 12. Further, it is more difficult for the webbing 6 to become separated from the support member 12 through the inlet 43 in comparison with when the inlet 43 is formed at a wall portion located in the widthwise direction of a webbing.

(6) The lever 15 is arranged to move integrally with the actuation pin 51, and operation of the lever 15 continuously moves the support member 12 between the storage position and the projection position and in the vertical direction of the seat back 4 at the storage position. Therefore, by operating the lever 15, the passenger may perform the assistance operation and the adjustment operation. Further, the need for a driving mechanism such as a motor in the auxiliary mechanism 11 is eliminated. This prevents costs from increasing.

A second embodiment of the invention will now be discussed with reference to FIGS. 6 to 12. The auxiliary mechanism of the second embodiment mainly differs from the auxiliary mechanism of the first embodiment only in the structure for driving the support member and the angle. Therefore, to avoid redundancy, like or same reference numerals are given to those components that are the same as the corresponding components of the first embodiment. Such components will not be described.

Referring to FIG. 6, an auxiliary mechanism 61 includes a motor 62, a reduction gear 63, which includes a plurality of gears (not illustrated) to reduce the rotation of the motor 62, a screw shaft 64, which is connected to the reduction gear 63, and a slide nut 65 (see FIGS. 8 and 9), which is engaged with the screw shaft 64. A controller 66 is connected to the motor 62 to control and drive the motor 62.

More particularly, the reduction gear 63, which is attached to the motor 62, is fixed to the lower side of the guide plate 13 on the mounting surface 24. A gap is provided between the guide plate 13 and the reduction gear 63 to allow for the angle 14 to be received therein. A shaft support wall 71 projects in the thicknesswise direction of the guide plate 13 from the upper side of the mounting surface 24. The screw shaft 64 is rotatably supported between the reduction gear 63 and the shaft support wall 71. The screw shaft 64 is parallel to the actuation groove 21. When rotation produced by the motor 62 is transmitted to the screw shaft 64 by the reduction gear 63, the slide nut 65, which is engaged with the screw shaft 64, moves in the axial direction of the screw shaft 64 in accordance with the rotation.

Referring to FIG. 7, the actuation pin 51 is inserted into a slide joint 73 through a cylindrical member 72, which is formed by a tubular resin material (e.g., polyoxymethylene (POM)), and fixed to the actuation pin hole 33 of the angle 14. A clamp 73a is formed on the slide joint 73 to clamp the slide nut 65. The clamp 73a clamps the slide nut 65 to integrally move the slide nut 65 and the angle 14. In the same manner as the first embodiment, the intermediate pin 52 and the action pin 53 are fixed to the angle 14.

Accordingly, in the auxiliary mechanism 61 of the second embodiment, the controller 66 controls and drives the motor 62 so that the position of the support member 12 is controllable as illustrated in the states of FIGS. 6, 8, and 9. FIG. 6 illustrates a state in which the support member 12 is located at the adjustment lower limit position, FIG. 8 illustrates a state in which the support member 12 is located at the adjustment upper limit position, and FIG. 9 illustrates a state in which the support member 12 is located at the projection position. Therefore, when the motor 62 is driven, the guide plate 13 guides the movement of the support member 12 between the storage position and the projection position and then continuously guides the movement of the support member 12 in the vertical direction of the seat back 4 at the storage position. In this embodiment, when performing the adjustment operation, the motor 62 produces rotation at a higher speed than when performing the assistance operation.

The electric configuration of the auxiliary mechanism 61 will now be discussed.

Figure 10:
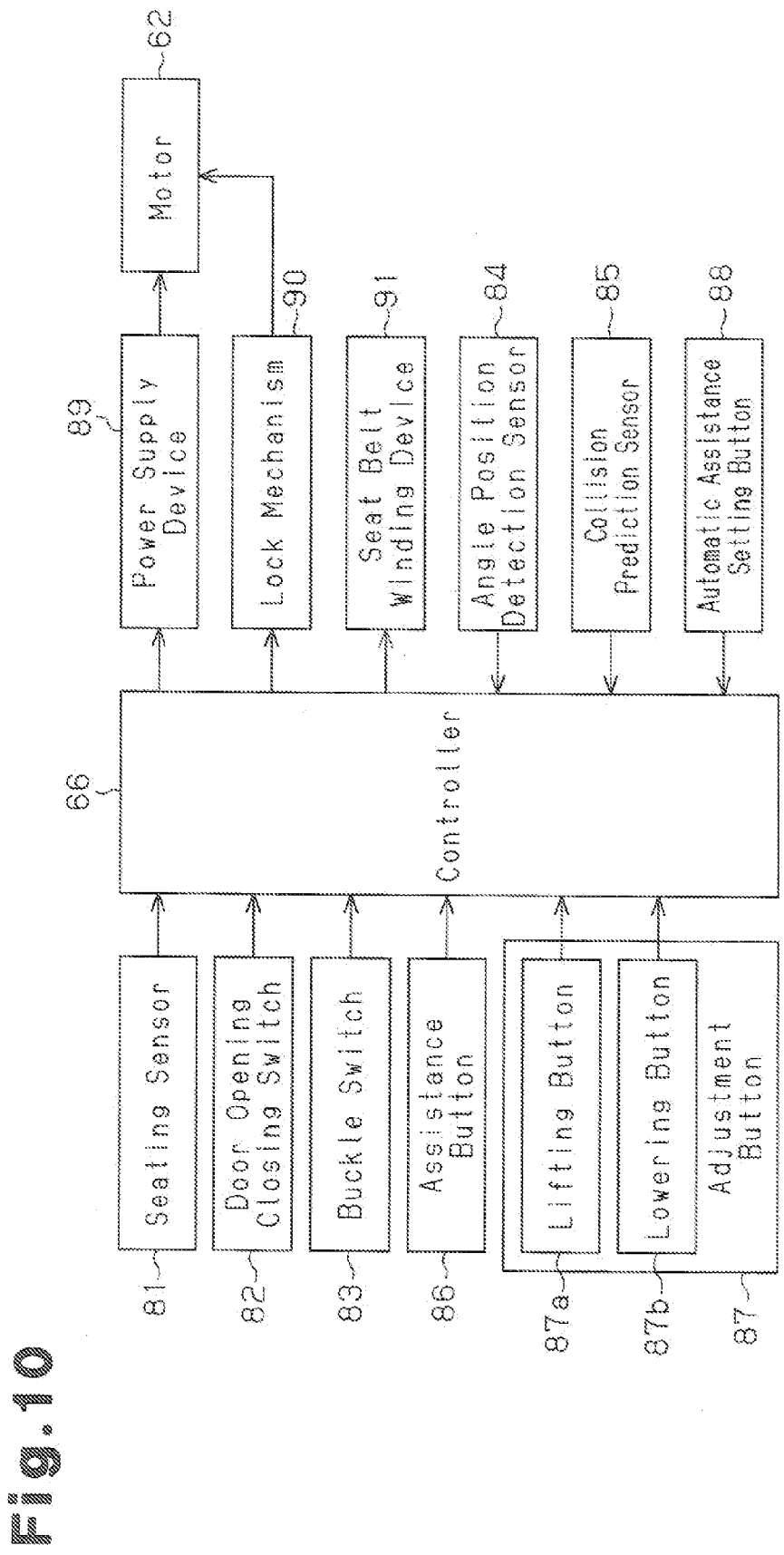
FIG. 10 is a block diagram illustrating the electric configuration of the auxiliary mechanism of FIG. 6.

Referring to FIG. 10, the controller 66 controls a power supply device 89 to drive the motor 62 based on signals from a seating sensor 81, a door opening and closing switch 82, a buckle switch 83, an angle position detection sensor 84, a collision prediction sensor 85, an assistance button 86, an adjustment button 87, and an automatic assistance setting button 88. The controller 66 controls operation of a lock mechanism 90 and a seat belt winding device 91 based on the above-described signals. The controller 66 includes a timer circuit (not illustrated).

The seating sensor 81 detects whether or not the passenger has been seated on the seat cushion 3. For example, the seating sensor 81 includes a pressure sensor arranged in the seat cushion 3 and outputs a seating detection signal in accordance with the presence of a passenger. The controller 66 determines whether or not the passenger is seated on vehicle seat 1 based on the seating detection signal.

The door opening and closing switch 82 serves as a door opening and closing detection unit and detects open and closed states of a door 5b (see FIG. 1) located beside the vehicle seat 1. The door opening and closing switch 82 provides an opening and closing detection signal to the controller 66 in accordance with the opening and closing state of the door. The controller 66 determines whether or not the door 5b is open or closed based on the opening and closing detection signal.

The buckle switch 83 serves as a seat belt fastening detection unit and detects whether or not the passenger has fastened the seat belt apparatus 2. Specifically, as the passenger holds the webbing 6 and further draws out the webbing 6 from the seat belt winding device 91 to engage the tongue plate 7 with the buckle 8, the buckle switch 83 provides the controller 66 with a fastening detection signal indicating that the seat belt apparatus 2 has been fastened. The controller 66 recognizes whether or not the seat belt apparatus 2 has been fastened based on the fastening detection signal.

The angle position detection sensor 84 detects the position of the support member 12 based on a rotation angle of the motor 62. Specifically, the position of the support member 12 (angle 14) and the rotation position of the motor 62 are associated beforehand, and the controller 66 detects the position of the support member 12 based on the detection signal provided from the angle position detection sensor 84 in accordance with the rotation angle of the motor 62.

The collision prediction sensor 85 includes a speed sensor. The speed sensor predicts a collision of the vehicle, which includes the vehicle seat 1, and detects, for example, a brake depression speed. The controller 66 predicts a collision of the vehicle based on a collision prediction signal provided from the collision prediction sensor 85 when the passenger suddenly depresses the brake. When the predicting collision of the vehicle, the controller 66 provides a control signal to the lock mechanism 90 to lock the motor 62 so that the support member 12 is not displaced by an impact, and the controller 66 drives the seat belt winding device 91 to wind the webbing 6.

The assistance button 86 is arranged at the passenger compartment side of a door panel of the door 5b. When the passenger, who is seated on the vehicle seat 1, operates the assistance button 86, the assistance button 86 provides an assist signal to the controller 66. When the assist signal is provided to the controller 66, the controller 66 determines that the passenger seated on the vehicle seat 1 intends to fasten the seat belt apparatus 2, and the controller 66 performs an assistance process for aiding fastening of the seat belt apparatus 2. When the assistance button 86 is operated again during the assistance process, the assistance button 86 provides a cancellation signal to the controller 66. When the cancellation signal is provided to the controller 66, the controller 66 cancels the assistance operation to move the support member 12 to the storage position.

The adjustment button 87 includes a lifting button 87a that upwardly moves the support member 12 in the storage position and a lowering button 87b that downwardly moves the support member 12 in the storage position. The lifting button 87a and the lowering button 87b are arranged in the door panel of the door 5b, which is located inside the vehicle. When the passenger manipulates the adjustment button 87, the adjustment button 87 provides an adjustment signal to the controller 66. When receiving the adjustment signal, the controller 66 drives the motor 62 in correspondence with the pressed lifting button 87a or lowering button 87b to move the support member 12 along the vertical direction of the seat back 4.

The automatic assistance setting button 88 is arranged at the passenger compartment side of the door panel of the door 5b. The passenger operates the automatic assistance setting button 88 to set or cancel automatic assistance. During automatic assistance, the assistance operation is automatically performed when the passenger enters or leaves the vehicle. In a state in which the automatic assistance is set, the controller 66 automatically performs an assistance operation when the passenger enters or leaves the vehicle. In a state in which the automatic assistance is canceled, the controller 66 does not perform the assistance operation until the passenger operates the assistance button 86.

Figure 11:
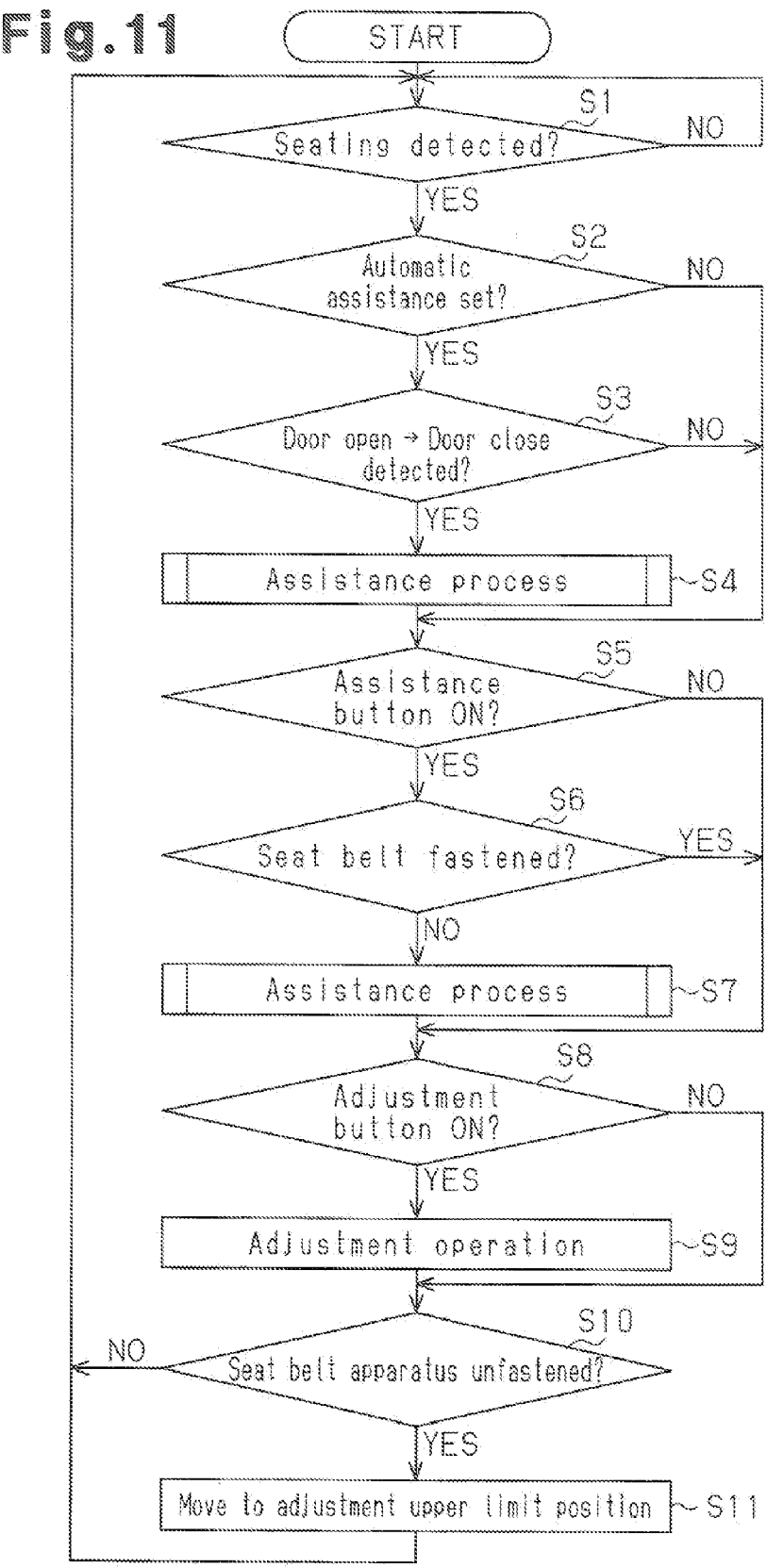
FIG. 11 is a flowchart illustrating the procedures of a fastening aiding process executed by a controller.

The procedures of the fastening aid process performed by the controller 66 in the auxiliary mechanism 61 will now be discussed with reference to the flowchart of FIG. 11. When the passenger is not seated on the vehicle seat 1, the controller 66 arranges the support member 12 at the storage position (the adjustment upper limit position) as illustrated in FIG. 8. Therefore, the support member 12 is prevented from interfering with the passenger when the passenger enters or leaves the vehicle.

In step S1, the controller 66 determines whether or not the passenger is seated on the vehicle seat 1 based on the seating detection signal provided from the seating sensor 81. When the passenger is seated on the vehicle seat 1, in step S2, the controller 66 determines whether or not automatic assistance is set. When the automatic assistance is set, in step S3, the controller 66 determines from the opening and closing detection signal of the door opening and closing switch 82 whether or not the passenger has closed the door 5b, which is located beside the vehicle seat 1, after opening the door 5b to enter the vehicle. The timer of the second embodiment measures an elapsed time from when the door 5b is closed, and the controller 66 determines that the passenger has closed the door 5b after opening the door 5b to enter the vehicle if the elapsed time within a predetermined time. In step S3, if the door 5b located beside the vehicle seat 1 is closed, the controller 66 determines that the passenger has sat on the vehicle seat 1 to close the door 5b. Thus, in step S4, the controller 66 performs the assistance process and proceeds to step S5. If the passenger is not seated on the vehicle seat 1 in step S1, the controller 66 repeats the determination process of step S1 until the passenger sits on the vehicle seat 1.

In step S5, if the automatic assistance has not been set in step S2 or if the door 5b has not been closed in step 3, the controller 66 determines whether or not the assistance button 86 has been turned on. In step S5, if the assistance button 86 has been turned on, in step S6, the controller 66 determines from the fastening detection signal of the buckle switch 83 whether or not the seat belt apparatus 2 has been fastened, that is, whether or not the tongue plate 7 has been engaged with the buckle 8. When the tongue plate 7 is not engaged with the buckle 8, in step S7, the controller 66 performs the assistance process.

When the assistance button 86 is not turned on in step S5, when the tongue plate 7 is engaged with the buckle 8 in step S6, or after the assistance operation has been performed in step S7, the controller 66 determines whether or not the adjustment button 87 (the lifting button 87a or the lowering button 87b) has been operated in step S8. In step S8, if the lifting button 87a or the lowering button 87b has been turned on, in step S9, the controller 66 provides the control signal to the power supply device 89 to produce rotation with the motor 62 when the lifting button 87a or the lowering button 87b is turned on to lift or lower the support member 12 in the vertical direction of the seat back 4 and perform the adjustment operation. If the adjustment button 87 has not been operated in step S8 or after the adjustment operation is performed in step S9, the controller 66 in step S10 determines whether or not the seat belt apparatus 2 is unfastened, that is, whether or not the tongue plate 7 is disengaged from the buckle 8. When the tongue plate 7 is disengaged from the buckle 8, the controller 66 determines that the passenger intends to leave the vehicle and, in step S1, moves the support member 12 to the adjustment upper limit position and performs the determination process of step 1. This prevents the support member 12 from interfering with the passenger when the passenger enters or leaves the vehicle. When the tongue plate 7 is not disengaged from the buckle 8 in step S10, the controller 66 performs the determination process of step S1 without moving the support member 12.

Figure 12:
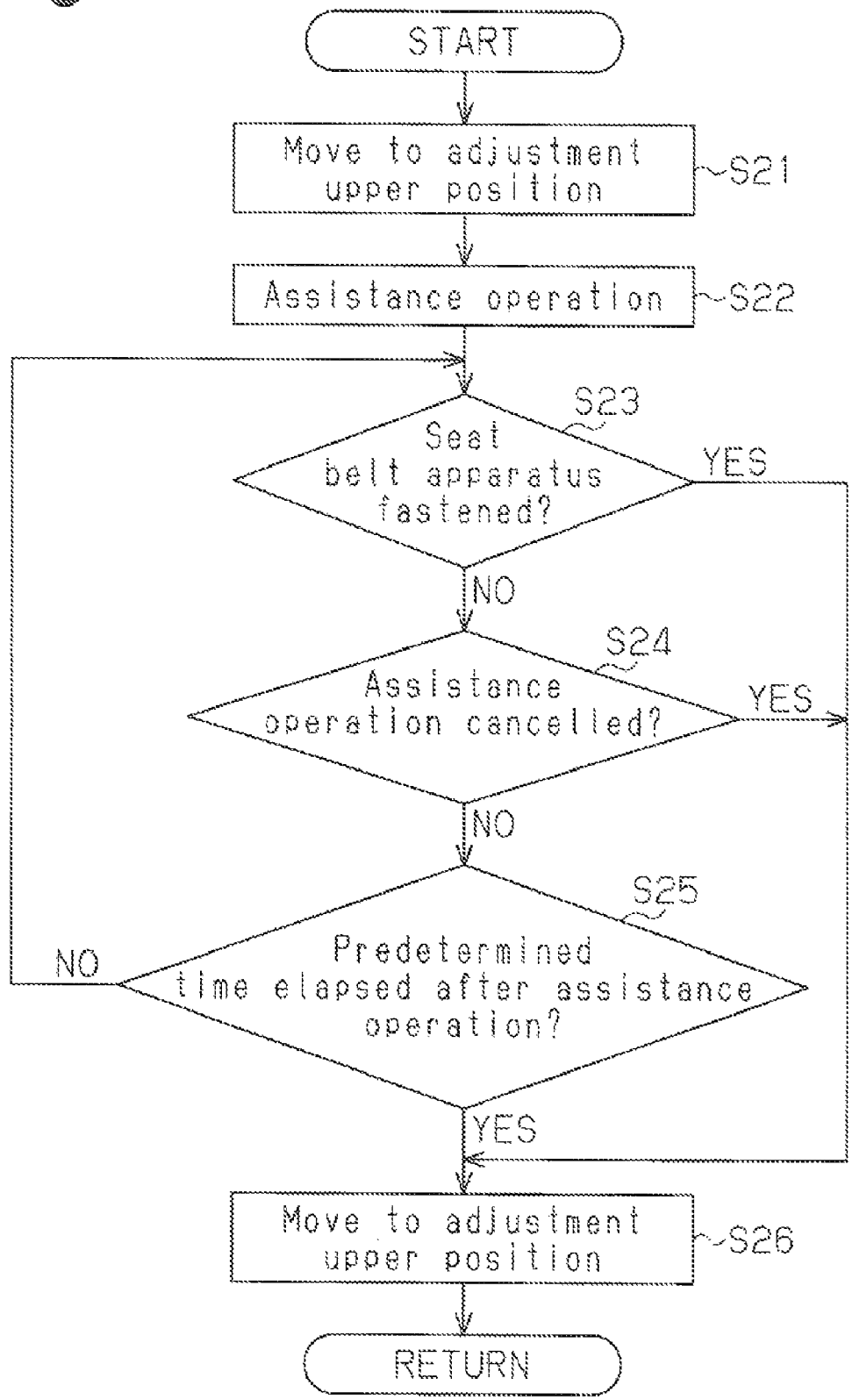
FIG. 12 is a flowchart illustrating the procedure of an assistance process executed by the controller.

The procedures of the assistance process (steps S4 and S7) performed by the controller 66 will now be discussed with reference to the flowchart of FIG. 12.

First, in step S21, the controller 66 moves the support member 12 to the adjustment upper limit position. Then, in step S22, the controller 66 performs the assistance operation. Subsequently, in step S23, the controller 66 determines whether or not the tongue plate 7 is engaged with the buckle 8. When the tongue plate 7 is not engaged with the buckle 8, in step S24, the controller 66 determines whether or not the passenger has operated the assistance button 86 to cancel the assistance operation. When the assistance operation has not been cancelled, in step S25, the controller 66 determines in step S22 whether or not a predetermined time has elapsed after the assistance operation. A timer measures the elapsed time from when the assistance operation is performed, and the controller 66 uses the timer for the determination. When the predetermined time has not elapsed after the assistance operation has been performed in step S25, the controller 66 performs the determination process in step S23.

When the tongue plate 7 is engaged with the buckle 8 in step S23, when the assistance operation is cancelled in step S24, or when the predetermined time has elapsed after performing the assistance operation in step S25, the controller 66 in step S26 moves the support member 12 to the adjustment upper limit position to end the assistance process.

In addition to advantages (1) to (5) of the first embodiment, the second embodiment has the advantages described below.

(7) The auxiliary mechanism 61 of the second embodiment includes the slide nut 65, the screw shaft 64, the motor 62, and the controller 66. The slide nut 65 moves integrally with the actuation pin 51. The slide nut 65 is fastened to the screw shaft 64, and the screw shaft 64 is parallel to the actuation groove 21. The motor 62 rotates the screw shaft 64. The controller 66 controls and drives the motor 62. The driving of the motor 62 moves the support member 12 between the storage position and the projection position and then continuously along the vertical direction of the seat back 4 in the storage position. In this manner, the assistance operation and the adjustment operation are performed by driving the motor 62. This reduces the burden on the passenger compared with when the passenger manually performs the assistance operation and the adjustment operation.

(8) The controller 66 moves the support member 12 to the projection position when determining that the passenger is seated on the vehicle seat 1 and the door 5b is closed. Therefore, when the passenger sits on the vehicle seat 1 and closes the door 5b, the support member 12 is automatically moved to the projection position, that is, the assistance operation is automatically performed. This eliminates the burden on the passenger required to arrange the support member 12 at the projection position and encourages the passenger to fasten the seat belt apparatus 2.

(9) The controller 66 moves the support member 12 to the storage position when determining that the passenger has fastened the seat belt apparatus 2. This prevents the support member 12 from interfering with the passenger seated on the vehicle seat 1. Further, the passenger does not have to operate a switch to move the support member 12 to the storage position. This eliminates the burden on the passenger required to arrange the support member 12 at the storage position after fastening the seat belt apparatus 2.

(10) When performing the adjustment operation, the controller 66 produces rotation with the motor 62 at a higher speed than during the assistance operation. This readily provides aid for the fastening of the seat belt apparatus 2 and allows for easy fine adjustment of the support position of the webbing 6.

(11) The automatic assistance setting button 88 is employed to set or cancel automatic assistance during which the assistance operation is automatically performed when the passenger enters or leaves the vehicle. Thus, the passenger may select whether or not to set the automatic assistance. This improves the versatility of the auxiliary mechanism 61.

A third embodiment of the invention will now be discussed with reference to FIGS. 13 to 16. In this embodiment, the guide plate structure and angle coupling structure are mainly changed from the auxiliary mechanism of the second embodiment. To facilitate illustration, like or same reference numerals are given to those components that are the same as the corresponding components of the first and second embodiments. Such components will not be described.

Referring to FIG. 13, an accommodation portion 101c is formed in a seat back 101 of this embodiment. The accommodation portion 101c opens from a central portion 101a in the vertical direction of the seat back 101 to an upper portion 101b. The accommodation portion 101c is formed in the seat back 101 at a region located toward the sidewall 5a of the passenger compartment. The seat back 101 includes a front surface 102 in which a portion corresponding to the central portion 101a is a planar surface having a linear cross-section and a portion corresponding to the upper portion 101b is a curved surface having an arcuate cross-section.

An auxiliary mechanism 111 includes the support member 12 formed in the same manner as the second embodiment. The auxiliary mechanism 111 is arranged in the seat back 101 in a state in which it is partially exposed such that a drawing surface 12a of the support member 12 is flush with the front surface 102 of the seat back 101. In the seat belt apparatus 2 of the this embodiment, the webbing 6 has a basal end wound onto a winding device (not illustrated), which is arranged in the seat back 101, and a distal end inserted through the support member 12 and fixed to the rear side of the seat cushion 3 toward the sidewall 5a of the passenger compartment.

The structure of the auxiliary mechanism 111 will now be discussed.

Referring to FIG. 14, the auxiliary mechanism 111 includes a rectangular guide plate 112 and an angle 114 having generally elongated quadrangular prism shape. The guide plate 112 serves as a guide portion fixed to the inside of the seat back 101. The angle 114 is arranged near a mounting surface 113 of the guide plate 112, and the support member 12 is fixed to the angle 114. The support member 12 and the angle 114 form a support portion. In the same manner as the second embodiment, the guide plate 112 is arranged at a position located toward the side surface in the seat back 101 so that the longitudinal direction of the guide plate 112 is aligned with the vertical direction of the seat back 101 and the lateral direction of the guide plate 112 is aligned with the forward-rearward direction of the seat back 101. That is, the guide plate 112 is located away from the passenger. Although the guide plate 112 is partially arranged near the backrest surface of the seat back 101, the backrest feel of the passenger is subtly affected because the guide plate 112 is located away from the passenger in the seat back 101. In this embodiment, the guide plate 112 is formed so as to be located in the upper portion 101b of the seat back 101 in a state in which the support member 12 is at the adjustment upper limit position.

Figure 15:
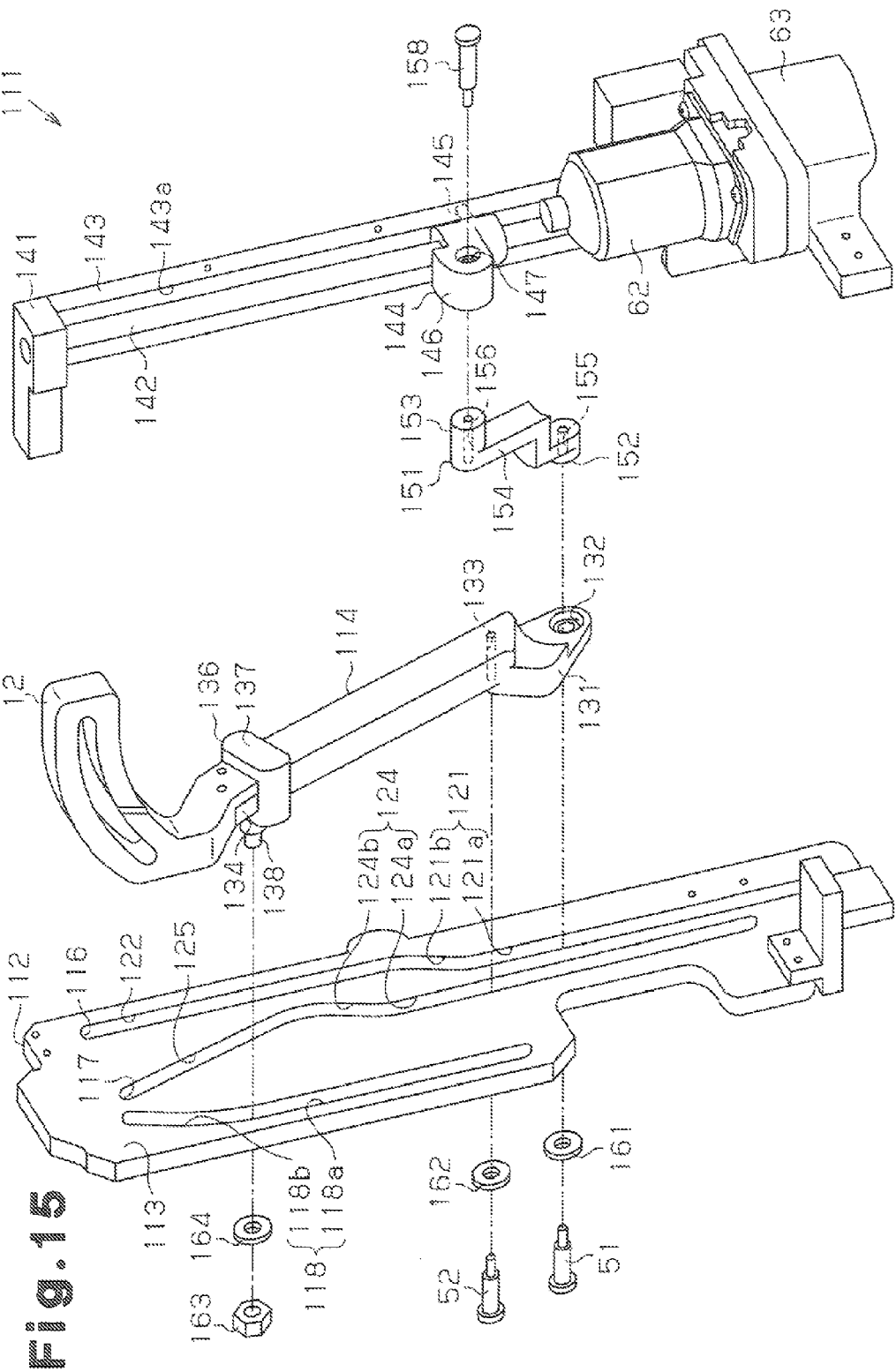
FIG. 15 is an exploded perspective view illustrating the auxiliary mechanism of FIG. 13.

As illustrated in FIG. 15, the guide plate 112 includes an actuation groove 116 serving as an actuation guide portion, an intermediate groove 117 serving as an intermediate guide portion, and an action groove 118 serving as an action guide portion, which are formed in parallel from the rear toward the front of the seat back 101 in the order of the actuation groove 116, the intermediate groove 117, and the action groove 118. The actuation groove 116, the intermediate groove 117, and the action groove 118 extend through the thicknesswise direction of the guide plate 112.

The actuation groove 116 includes an adjustment actuation portion 121 and an assistance actuation portion 122. The adjustment actuation portion 121 extends so as to follow the undulations of the front surface 102 of the seat back 101. The assistance actuation portion 122 extends continuously from the adjustment actuation portion 121. Specifically, the adjustment actuation portion 121 includes a linear portion 121a and a curved portion 121b. The linear portion 121a is parallel to the part of the front surface 102 corresponding to the central portion 101a of the seat back 101. The curved portion 121b has the same curvature as that of the part of the front surface 102 corresponding to the upper portion 101b of the seat back 101. The assistance actuation portion 122 is continuous with the upper end of the adjustment actuation portion 121 (curved portion 121b) and the assistance actuation portion 122 extends linearly upward toward the top side of the seat back 101. An angle formed by the longitudinal direction of the assistance actuation portion 122 and the vertical direction of the seat back 101 is changed when necessary in accordance with the inclination angle of the angle 114 relative to the seat back 101 in a state in which the support member 12 is in the projection position.

The intermediate groove 117 includes an adjustment intermediate portion 124 and an assistance intermediate portion 125. The adjustment intermediate portion 124 is shaped identically to the adjustment actuation portion 121. The assistance intermediate portion 125 is formed continuously from the adjustment intermediate portion 124. Specifically, the adjustment intermediate portion 124 includes a linear portion 124a and a curved portion 124b. The linear portion 124a is parallel to the part of the front surface 102 corresponding to the central portion 101a of the seat back 101. The curved portion 124b has the same curvature as the part of the front surface 102 corresponding to the upper portion 101b of the seat back 101. The adjustment intermediate portion 124 is spaced from the adjustment actuation portion 121 in the axial direction of the angle 114 by a first predetermined distance that is shorter than the axial length of the angle 114 so that the support member 12 moves the angle 114 while keeping the posture of the angle 114 located in the storage position. Specifically the adjustment actuation portion 121 and the adjustment intermediate portion 124 are formed spaced from each other by a maximum distance in the forward-rearward direction between the assistance actuation portion 122 and the assistance intermediate portion 125, that is, a distance in the forward-rearward direction at the upper side of the guide plate 112. The assistance intermediate portion 125 is continuous with the upper end of the adjustment intermediate portion 124 (curved portion 124b) and formed to be diagonal and linear so as to be spaced away from the assistance actuation portion 122 as the longitudinal end of the intermediate groove 117 becomes closer.

The action groove 118 is shaped identically to the adjustment actuation portion 121. Specifically the action groove 118 includes a linear portion 118a and a curved portion 118b.

The linear portion 118a is parallel to the part of the front surface 102 corresponding to the central portion 101a of the seat back 101. The curved portion 118b has the same curvature as that of the part of the front surface 102 corresponding to the upper portion 101b of the seat back 101. The action groove 118 is spaced from the adjustment actuation portion 121 by a second predetermined distance such that the support member 12 moves the angle 114 while keeping the posture of the angle 114 located in the storage position. In a state in which the angle 114 is located in the storage position, the second predetermined distance is longer than the first predetermined distance in the axial direction, and the second predetermined distance is shorter than the length of the angle 114 in the axial direction.

In this embodiment, a joint hole 132 extends through a basal portion 131 of the angle 114 in the thicknesswise direction of the guide plate 112, and an intermediate pin hole 133 is formed spaced by the first predetermined distance toward the distal end in the axial direction of the angle 114 from the joint hole 132. In the same manner as the second embodiment, the support member 12 is fixed to a distal portion 134 of the angle 114.

A collar 136, which is movable in the longitudinal direction of the angle 114, is arranged in the angle 114. The collar 136 includes a main body portion 137 and an action pin portion 138. The main body portion 137 is externally fitted onto the angle 114 and has the shape of a square frame. The action pin portion 138 extends from the main body portion 137 in the thicknesswise direction of the guide plate 112 and is insertable into the action groove 118.

As illustrated in FIGS. 14 and 15, the reduction gear 63, which is attached to the motor 62, is fixed to the lower side of the mounting surface 113 of the guide plate 112. In the same manner as the second embodiment, a gap into which the angle 114 is movable is provided between the guide plate 112 and the reduction gear 63. The controller 66 is connected to the motor 62 and executes the fastening aiding process in the same manner as in the second embodiment.

A shaft support wall 141 projects from the top side of the mounting surface 113 of the guide plate 112 in the thicknesswise direction of the guide plate 112. A linear screw shaft 142 is rotatably supported between the reduction gear 63 and the shaft support wall 141. The screw shaft 142 is arranged parallel to the linear portion 121a of the adjustment actuation portion 121. Accordingly, in this embodiment, the distance between the actuation groove 116 and the screw shaft 142 in the radial direction of the screw shaft 142 varies in the axial direction of the screw shaft 142. A nut guide 143 is arranged between the shaft support wall 141 and the reduction gear 63. A guide groove 143a, which extends through the nut guide 143 in the lateral direction of the guide plate 112, extends in the vertical direction of the guide plate 112.

A slide nut 144 is engaged with the screw shaft 142. The slide nut 144 of this embodiment includes an insertion portion 145, which extends in the forward-rearward direction is of the guide plate 112 and which is inserted into the guide groove 143a of the nut guide 143. The slide nut 144 is moved along the vertical direction of the seat back 101 as the screw shaft 142 rotates. An extended portion 146 is formed in the slide nut 144 of this embodiment at a position located opposite the insertion portion 145 in the forward-rearward direction. A joint hole 147 extends through the extended portion 146 in the thicknesswise direction of the guide plate 112.

The auxiliary mechanism 111 of this embodiment includes a joint 151, which couples the basal portion 131 of the angle 114 and the slide nut 144 so as to absorb changes in the spaced distance between the basal portion 131 of the angle 114 and the slide nut 144 as the slide nut 144 moves vertically. Specifically, the joint 151 is pivoted relative to the angle 114 and the slide nut 144 to vary the spaced distance in the radial direction of the screw shaft 142 between the basal portion 131 of the angle 114 and the slide nut 144 as the slide nut 144 moves vertically. The joint 151 includes an insertion portion 152, which is pivotally inserted into the joint hole 132 of the angle 114, and an insertion portion 153, which is pivotally inserted into the joint hole 147 formed in the slide nut 144. The coupling portion 154 couples the insertion portion 152 and the insertion portion 153. An actuation pin hole 155 is formed in the insertion portion 152, and a joint pin hole 156 is formed in the insertion portion 153.

The guide plate 112, the angle 114, the joint 151, and the slide nut 144 are coupled to one another by the actuation pin 51 inserted into the actuation groove 116, the intermediate pin 52 inserted into the intermediate groove 117, the collar 136 of which the action pin portion 138 is inserted into the action groove 118, and the joint pin 158 inserted into the slide nut 144.

Specifically, the insertion portion 152 of the joint 151 is inserted into the joint hole 132 of the angle 114, and the insertion portion 153 is inserted into the joint hole 147 of the slide nut 144. The actuation pin 51 is inserted into the actuation groove 116 and the joint hole 132 of the angle 114, and the actuation pin 51 is fixed to the actuation pin hole 155 formed in the insertion portion 152 of the joint 151. A washer 161 is arranged between the actuation pin 51 and the guide plate 112. The joint pin 158 is inserted into the joint hole 147 of the slide nut 144, and the joint pin 158 is fixed to the joint pin hole 156 formed in the insertion portion 153 of the joint 151. Therefore, the joint 151 is pivotal relative to the slide nut 144 and the angle 114.

In the same manner as in the second embodiment, the intermediate pin 52 is inserted into the intermediate groove 117, and the intermediate pin 52 is fixed to the intermediate pin hole 133 formed in the angle 114. A washer 162 is arranged between the intermediate pin 52 and the guide plate 112.

The action pin portion 138 of the collar 136 is inserted into the action groove 118, and the action pin portion 138 is fixed by the nut 163 from the side opposite the mounting surface 113 of the guide plate 112. A washer 164 is arranged between the nut 163 and the guide plate 112. In the third embodiment, the collar 136 and the nut 163 form the coupling portion.

In this manner, the angle 114 is coupled to the guide plate 112 by the collar 136 and coupled to the screw shaft 142 by the joint 151 and the slide nut 144. That is, the angle 114 is coupled to the guide plate 112 and the screw shaft 142 with a positional relationship in which the angle 114 is arranged between the guide plate 112 and the screw shaft 142. This stabilizes the support and operation of the angle 114 and improves the rigidity of the auxiliary mechanism 111.

When the motor 62 is driven to slide the slide nut 144 in the vertical direction, the actuation pin 51, the intermediate pin 52, and the action pin portion 138 are moved respectively in the actuation groove 116, the intermediate groove 117, and the action groove 118. Further, the angle 114 moves relative to the guide plate 112.

The operation of the auxiliary mechanism 111 will now be discussed.

First, as illustrated in FIG. 16A, when the slide nut 144 (not illustrated in FIG. 16A) is located at the lower end of the actuation groove 116, the support member 12 is at an adjustment lower limit position.

Next, when the motor 62 is driven to upwardly slide the slide nut 144, as illustrated in FIG. 16B, the support member 12 and the angle 114 are linearly moved in parallel until the actuation pin 51 enters the curved portion 121b of the adjustment actuation portion 121. Therefore, the support member 12 is moved in parallel while being spaced by a constant distance from the part of the front surface 102 corresponding to the central portion 101a of the seat back 101. In this state, the actuation pin 51, the intermediate pin 52 (not illustrated in FIGS. 16A to 16D), and the action pin portion 138 (not illustrated in FIGS. 16A to 16D) are moved in the linear portion 121a of the adjustment actuation portion 121, the linear portion 124a of the adjustment intermediate portion 124, and the linear portion 118a of the action groove 118, respectively. FIG. 16B illustrates a state immediately before the actuation pin 51 enters the curved portion 121b of the adjustment actuation portion 121.

When the slide nut 144 is further moved upward from the state shown in FIG. 16B, the joint 151 is pivoted to move the actuation pin 51 in the curved portion 121b of the adjustment actuation portion 121 as illustrated in FIG. 16C. In this state, at the same time as when the actuation pin 51 enters the curved portion 121b of the adjustment actuation portion 121, the intermediate pin 52 and the action pin portion 138 are respectively moved in the curved portion 124b of the adjustment intermediate portion 124 and the curved portion 118b of the action groove 118. This moves in parallel the support member 12 and the angle 114 with the distance remaining constant from the part of the front surface 102 corresponding to the upper portion 101b of the seat back 101. FIG. 16C illustrates a state immediately before the actuation pin 51 enters the assistance actuation portion 122 in which the support member 12 is in the adjustment upper limit position.

Then, when the slide nut 144 slides further upward from the state shown in FIG. 16C, the distance in the forward-rearward direction (lateral direction) between the assistance actuation portion 122 and the assistance intermediate portion 125 increases as illustrated in FIG. 16D. This pivots the angle 114 so as to arrange the support member 12 frontward from the seat back 101. When the actuation pin 51 is moved in the assistance actuation portion 122, the pivoting of the angle 114 is not hindered since the collar 136 is moved along the axial direction of the angle 114. When the actuation pin 51 slide to the upper end of the actuation groove 116 as illustrated in FIG. 16D, the support member 12 is arranged at the projection position.

Accordingly, when the slide nut 144 is moved in the vertical direction, the guide plate 112 guides the movement of the support member 12 between the storage position and the projection position and then the guide plate 112 continuously guides the movement of the support member 12 in the vertical direction of the seat back 101 at the storage position.

In addition to advantages (1), (4), and (5) of the first embodiment and advantages (8) to (11) of the second embodiment, the third embodiment has the advantages described below.

(12) The actuation groove 116, which includes the adjustment actuation portion 121 and the assistance actuation portion 122, is formed in the guide plate 112. The adjustment actuation portion 121 extends so as to follow the undulations in the front surface 102 of the seat back 101. The assistance actuation portion 122 extends continuously from the adjustment actuation portion 121. The intermediate groove 117, which includes the adjustment intermediate portion 124 and the assistance intermediate portion 125, is also formed in the guide plate 112. The adjustment intermediate portion 124 is shaped identically to the adjustment actuation portion 121, and the adjustment intermediate portion 124 is spaced from the adjustment actuation portion 121 by the first predetermined distance. Accordingly, the angle 114 is moved while keeping the posture of the angle 114 in a state where the support member 12 is located in the storage position. The assistance intermediate portion 125 is formed continuously from the adjustment intermediate portion 124. The guide plate 112 and the angle 114 are coupled together in a state in which the actuation pin 51 and the intermediate pin 52 are fixed to the basal portion 131 of the angle 114 spaced apart from each other by the first predetermined distance.

Therefore, when the actuation pin 51 is moved in the adjustment actuation portion 121 (when the intermediate pin 52 is moved in the adjustment intermediate portion 124), the support member 12 and the angle 114 are moved along the longitudinal direction of the adjustment actuation portion 121. In this state, the adjustment intermediate portion 124 is spaced from the adjustment actuation portion 121 by the first predetermined distance such that the angle 114 moves while keeping the posture of the angle 114 in a state where the support member 12 is located in the storage position, and the actuation pin 51 and the intermediate pin 52 are fixed to the basal portion 131 of the angle 114 while being spaced from each other by the first predetermined distance. Therefore, the support member 12 is movable in a manner following the undulations in the front surface 102 of the seat back 101. Accordingly, the distance between the support member 12 and the front surface 102 of the seat back 101 is kept constant during the adjustment operation. Thus, the webbing 6 is supported at a constant distance from the front surface 102 of the seat back 101 regardless of the adjusting position. This improves the aesthetic appeal of the vehicle seat 1 while giving a stable fastening feel to the passenger. Further, the adjustment operation may be performed by moving the actuation pin 51 in the adjustment actuation portion 121, and the assistance operation may be performed by moving the actuation pin 51 in the assistance actuation portion 122. This allows for the structure of the auxiliary mechanism ill to be simplified.

(13) The action groove 118 is formed in the guide plate 112, and the action groove 118 is spaced from the adjustment actuation portion 121 by the second predetermined distance, which is greater than the first predetermined distance. The action groove 118 is shaped identically to the adjustment actuation portion 121. The intermediate groove 117 is located between the action groove 118 and the actuation groove 116. This allows for the angle 114 to move while keeping the posture of the angle 114 in a state where the support member 12 is located in the storage position. The collar 136 is arranged in the angle 114, and the collar 136 includes the square-frame-shaped main body portion 137, which is movable in the axial direction and the action pin portion 138 that is extended from the main body portion. The guide plate 112 and the angle 114 are coupled by inserting the action pin portion 138 of the collar 136 into the action groove 118 in a manner movable in the longitudinal direction of the angle 114. Therefore, when the actuation pin 51 is moved in the assistance actuation portion 122, the pivoting of the angle 114 is not hindered since the collar 136 is moved in the axial direction of the angle 114. The action pin portion 138 of the collar 136 is inserted into the action groove 118 to couple the guide plate 112 and the angle 114. This reduces the stress applied to the angle 114 (in particular, the basal portion 131) and the guide plate 112 from the webbing 6 via the support member 12. As a result, the angle 114 may be elongated, and the size and weight of the angle 114 may be reduced while the amount of movement of the webbing 6 toward the front of the seat back 101 may be ensured during the assistance operation. Additionally, the action pin portion 138 of the collar 136 externally fitted onto the angle 114 is inserted into the action groove 118 to couple the guide plate 112 and the angle 114. This allows for the shape of the angle 114 to be simplified.

(14) The auxiliary mechanism 111 includes the joint 151, which couples the basal portion 131 of the angle 114 and the slide nut 144 so as to absorb the change in the spacing distance between the basal portion 131 of the angle 114 and the slide nut 144 in accordance with the vertical movement of the slide nut 144. Accordingly, even if the slide nut 144 is moved only in the linear direction along the screw shaft 142, by pivoting the joint 151, the actuation pin 51 is moved along the longitudinal direction of the curved portion 121*b* of the adjustment actuation portion 121. Therefore, the motor 62 is driven to rotate the linear screw shaft 142 and perform the assistance operation and the adjustment operation. This reduces the burden on the passenger compared to when the passenger manually performs the assistance operation and the adjustment operation.

A fourth embodiment of the invention will now be discussed with reference to FIGS. 17 and 18. The auxiliary mechanism of the fourth embodiment differs from the auxiliary mechanism of the third embodiment mainly in the structure of the guide plate. To facilitate illustration, like or same reference numerals are given to those components that are the same as the corresponding components of the first to third embodiments. Such components will not be described.

As illustrated in FIG. 17, a guide plate 172 serving as a guide portion of an auxiliary mechanism 171 in this embodiment includes an actuation groove 173 serving as the actuation guide portion, an intermediate groove 174 serving as the intermediate guide portion, and an action groove 175 serving as the action guide portion that are formed in parallel in the forward-rearward direction in the order of the actuation groove 173, the intermediate groove 174, and the action groove 175 from the rear toward the front of the seat back 101. The actuation groove 173, the intermediate groove 174, and the action groove 175 are formed so as to extend in the plate thicknesswise direction of the guide plate 112.

The actuation groove 173 is formed linearly. An additional assistance portion 173*a* is formed at the upper end of the actuation groove 173. The additional assistance portion 173*a* is inclined toward the intermediate groove 174 in the longitudinal direction of the guide plate 172, and the additional assistance portion 173*a* extends longer than the intermediate groove 174 toward the upper end of the guide plate 172.

The intermediate groove 174 is spaced from the actuation groove 173 by a predetermined distance in the forward-rearward direction (lateral direction). The intermediate groove 174 includes a parallel portion 174*a* and a linear inclined portion 174*b*. The parallel portion 174*a* extends parallel to the actuation groove 173 and is shorter than the actuation groove 173. The inclined portion 174*b* extends continuously from the parallel portion 174*a*, and the inclined portion 174*b* is inclined so as to be spaced from the actuation groove 173 toward the end portion in the longitudinal direction of the intermediate groove 174.

The action groove 175 is formed linearly in parallel with the actuation groove 173 with the intermediate groove 174 arranged between the action groove 175 and the actuation groove 173.

Further, in the same manner as the third embodiment, the guide plate 172, the angle 114, the joint 151, and the slide nut 144 are coupled to one another by the actuation pin 51 which is inserted into the actuation groove 173, the intermediate pin 52 which is inserted into the intermediate groove 174, the collar 136 of which the action pin portion 138 is inserted into the action groove 175, and the joint pin 158 which is inserted into the slide nut 144.

The operation of the auxiliary mechanism 111 will now be discussed.

First, as illustrated in FIG. 17, in a state in which the slide nut 144 (not illustrated in FIG. 17) is located at the lower end of the actuation groove 173, the support member 12 is in the adjustment lower limit position.

Then, when the motor 62 is driven to upwardly slide the slide nut 144, the support member 12 and the angle 114 are moved in parallel until the intermediate pin 52 enters the inclined portion 174*b*. Subsequently, as illustrated in FIG. 18A, when the slide nut 144 is moved upward and the intermediate pin 52 enters the inclined portion 174*b*, the distance in the forward-rearward direction (lateral direction) between the actuation groove 173 and the inclined portion 174*b* is increased. This pivots the angle 114 so that the support member 12 is located in front of the seat back 101.

When the slide nut 144 is further moved upward from the state shown in FIG. 18A, the joint 151 is pivoted and the actuation pin 51 enters the additional assistance portion 173*a*. At this point, the additional assistance portion 173*a* is inclined toward the intermediate groove 174 (inclined portion 174*b*) and extended more than the intermediate groove 174 (the inclined portion 174*b*) toward the upper side of the guide plate 172. Therefore, when the slide nut 144 is moved toward the upper side of the additional assistance portion 173*a*, the intermediate pin 52 is moved toward the lower side of the inclined portion 174*b* as the basal portion 131 of the angle 114 moves toward the front surface 102 of the seat back 101. Accordingly, the intermediate pin 52 is moved toward the lower side of the inclined portion 174*b*, and the support member 12 and the angle 114 are projected toward the front of the seat back 101. Thus, the axis of the angle 114 becomes close to horizontal. This allows the passenger to further easily grasp the webbing 6.

In addition to advantages (1) to (5) of the first embodiment, advantages (8) to (11) of the second embodiment, and advantage (14) of the third embodiment, the fourth embodiment has the advantages described below.

(15) The additional assistance portion 173*a* is formed at the upper end of the actuation groove 173 and inclined toward the intermediate groove 174 (the inclined portion 174*b*) in the longitudinal direction of the guide plate 172. Further, the additional assistance portion 173*a* is extended longer than the intermediate groove 174 (the inclined portion 174*b*) toward the upper side of the guide plate 172. Therefore, when the actuation pin 51 enters the additional assistance portion 173*a*, the support member 12 and the angle 114 move toward the front of the seat back 101. Further, the actuation pin 51 enters the additional assistance portion 173*a* and moves the intermediate pin 52 toward the lower side in the inclined portion 174*b*. Therefore, the axis of the angle 114 becomes close to horizontal line. This allows the passenger to further easily grasp the webbing 6.

The embodiments of the invention may be changed as follows.

In the first embodiment, the lever 15 is moved integrally with the angle 14. However, the present invention is not limited in this manner, and the lever 15 only needs to be cooperatively operated with the angle 14. For example, the lever may be arranged at a position where the passenger seated on the vehicle seat 1 may easily operate the lever, and the operation of the lever may be transmitted to the angle 14 through a link mechanism or the like.

In the first embodiment, when the intermediate pin 52 is moved from the parallel portion 22a to the inclined portion 22b, a restraint pin arranged on the guide plate 13 may be resiliently deformable in the thicknesswise direction of the guide plate 13 and restrict movement of the lever 15. This produces an operation feel when the lever 15 rides over the restraint pin. This allows the passenger to easily determine switching between the assistance operation and the adjustment operation.

In the second embodiment, the slide nut 65 is vertically moved by the rotation of the screw shaft 64. However, in lieu of the screw shaft 64, a push-pull cable capable of transmitting of a pulling motion and a pushing motion may be used. For example, a spiral projection may be formed by winding a piano wire around the push-pull cable, with one end of the push-pull cable fixed to the actuation pin 51, and a pinion engaged with the projection being rotated by a motor to vertically move the support member 12. In the same manner, a push-pull cable may be used in the third and fourth embodiments.

In the second to fourth embodiments, when the door 5b opens in a state in which the support member 12 is arranged at the projection position, the controller 66, which determines that the passenger is seated on the vehicle seat 1 and intends to leave the vehicle, may drive the motor 62 to arrange the support member 12 at the storage position. This prevents the support member 12 from interfering with the passenger. In this manner, various processes may be added when the controller 66 executes the fastening aiding process.

In the second to fourth embodiments, the controller 66 produces rotation with the motor 62 at a speed that is higher when performing the adjustment operation than when performing the assistance operation. However, the present invention is not limited in such a manner, and the motor 62 may produce rotation at a speed that is higher when performing the assistance operation than when performing the adjustment operation. Alternatively, the motor 62 may produce rotation at the same speed when performing the assistance operation and when performing the adjustment operation.

In the second to fourth embodiments, when predicting collision of the vehicle, the controller 66 provides a control signal to the lock mechanism 90 and locks the motor 62 so that an impact does not displace the support member 12. Further, the controller 66 drives the seat belt winding device 91 to wind the webbing 6. However, the present invention is not limited in such a manner, and the angle 14 may be mechanically fixed. Further, a lock mechanism that mechanically fixes the angle 14 or the lever 15 may be used in the first embodiment.

In the second to fourth embodiments, the seating sensor 81 that detects whether or not the passenger has been seated on the seat is used as the seating detection unit. However, the seating detection unit is not limited to the seating sensor 81 and any device may be used as long as it can detect the seating of the passenger. Accordingly, for example, a switch that is pressed by the passenger seated on the seat may be used as the seating detection unit.

In the second to fourth embodiments, the controller 66 moves the support member 12 to the projection position when determining that the passenger is seated on the vehicle seat 1 and the door 5b is closed. However, the present invention is not limited in such a manner. For example, the seating sensor 81 and the door opening and closing switch 82 may be eliminated, and the assistance operation may be performed only after the passenger turns on the assistance button 86.

In the second to fourth embodiments, the passenger operates the adjustment button 87 to perform the adjustment operation. However, the present invention is not limited in such a manner. For example, a sensor may be arranged in the seat back 4 in order to detect the position of the passenger's shoulders, and the controller 66 may automatically perform the adjustment operation in response to a signal from the sensor.

In the second to fourth embodiments, the automatic assistance setting button 88 is arranged in the door panel. However, the present invention is not limited in such a manner. For example, the automatic assistance setting button 88 may be arranged at another location, such as on an instrument panel. Further, the automatic assistance setting button 88 does not have to be arranged in the passenger compartment, and the assistance process may constantly be performed.

In the second to fourth embodiments, the assistance operation is cancelled when the assistance button 86 is pressed again during the assistance process. However, the present invention is not limited in such a manner. For example, a cancellation button for canceling the assistance operation may be provided.

In the second to fourth embodiments, when the seat belt apparatus 2 is not fastened, the controller 66 determines that the passenger intends to leave the vehicle, and the support member 12 is moved to the adjustment upper limit position. However, the present invention is not limited in such a manner. For example, another determination may be made in step 10 such as the door 5b opening.

In the third embodiment, the additional assistance portion may be formed at the upper end of the assistance actuation portion 122 (upper end of the actuation groove 116) in the same manner as the fourth embodiment.

In the first and second embodiments, the support member 12 in the storage position is projected in front of the support member 12. However, the present invention is not limited in such a manner. For example, in the same manner as in the third and fourth embodiments, the drawing surface 12a of the support member 12 may be flush with the front surface of the seat back 4. In the same manner, in the third and fourth embodiments, the drawing surface 12a of the support member 12 may be projected from the front surface 102 of the seat back 101.

In the third and fourth embodiments, the part of the front surface 102 corresponding to the central portion 101a of the seat back 101 is a planar surface having a linear cross-section, and the part of the front surface 102 corresponding to the upper portion 101b of the seat back 101 is a curved surface having an arcuate cross-section. However, the present invention is not limited in such a manner. For example, the front surface 102 of the seat back 101 may be formed to have a curved surface that conforms to the back of the passenger. In this case, the adjustment actuation portion 121, the adjustment intermediate portion 124, and the action groove 118 are of course formed to follow the curved surface.

In the third and fourth embodiments, the action pin portion 138 is formed in the collar 136. However, the present invention is not limited in such a manner. For example, instead of the action pin portion 138, an action pin hole may be formed in the main body portion 137 to couple the action pin 53.

In the third and fourth embodiments, the motor 62 and the like, may be eliminated, and a lever may be arranged in the insertion portion 153 of the joint 151 like the first embodiment so that the passenger operates the lever.

In the first and second embodiments, the slit 31 is formed in the angle 14, and the action pin 53 couples the guide plate 13 and the angle 14. Alternatively, in the same manner as the third and fourth embodiments, the collar 136 may couple the guide plate 13 and the angle 14. In the same manner, in the third and fourth embodiments, the slit may be formed in the angle 114, and the action pin 53 may couple the guide plate 112 and the angle 114. Additionally, instead of an action pin or collar, another coupling device may be used to couple the guide plates 13 and 112 and the angles 14 and 114.

In each of the above-described embodiments, in a state in which the support member 12 is at the storage position, the insertion hole 41 extends through the support member 12 in the forward-rearward direction of the seat back 4. However, the present invention is not limited in such a manner. For example, the insertion hole 41 may extend in another direction such as the vertical direction of the seat back 4.

In the first to fourth embodiments, the support member 12 is fixed to the distal portions 35 and 134 of the angles 14 and 114. However, the present invention is not limited in such a manner. For example, the angle and the support member may be formed integrally with each other.

In each of the above-described embodiments, the support member 12 is formed to have the shape of a square frame. However, the present invention is not limited in such a manner. For example, the support member 12 may be formed to have any shape, such as an annular shape as long as the support member 12 supports the webbing 6 movably in the longitudinal direction. In the same manner as the seat belt fastening auxiliary apparatus disclosed in Japanese Patent Application Laid-Open No. 2007-45189, a support portion may be formed by a grasp portion.

In the first and second embodiments, the inclined portion 22*b* is inclined relative to the actuation groove 21 at a fixed angle as illustrated in FIG. 2. However, the present invention is not limited in such a manner. For example, the inclined portion 22*b* may be inclined at any angle as long as it is not parallel to the actuation groove 21. Further, the inclination angle of the inclined portion relative to the actuation groove 21 may be varied along the longitudinal direction. In the same manner, in the third and fourth embodiments, the inclination angle of the assistance intermediate portion 125 or the inclined portion 174*b* may be varied along the longitudinal direction.

In the first and second embodiments, the action groove 23 is formed in the guide plate 13, the slit 31 is formed in the angle 14, and the action pin 53 couples the guide plate 13 and the angle 14. However, the action groove 23 and the slit 31 may be eliminated, and the guide plate 13 and the angle 14 do not have to be coupled by the action pin 53. In the same manner, in the third and fourth embodiments, the action groove 118 and 175 may be eliminated, and the guide plates 112 and 172 and the angle 114 do not have to be coupled by the collar 136.

In the third and fourth embodiments, the collar 136, which supports the angle 114, is inserted into and engaged with the action grooves 118 and 175 of the guide plates 112 and 172. Alternatively, the collar 136 may be engaged with a structure that is not a groove.

Figure 19A:
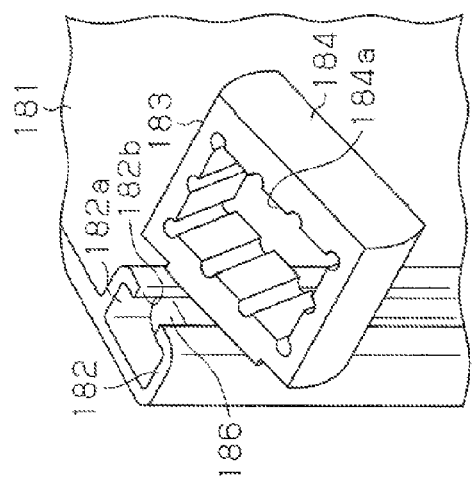
FIGS. 19A and 19B are views illustrating the connection of a guide plate and a collar in a further example.
Figure 19B:
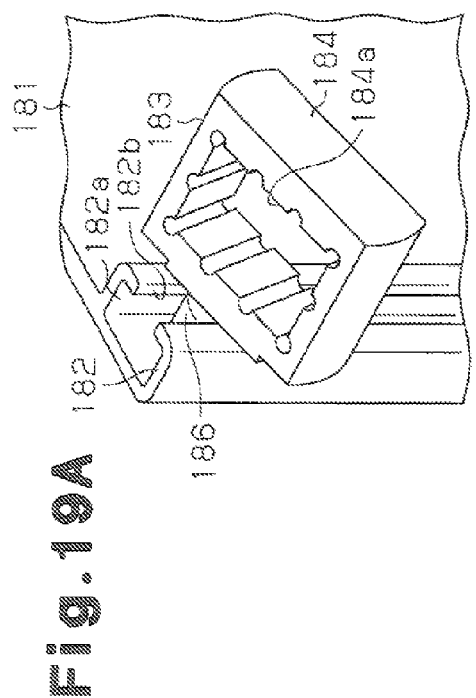

For example, in the form illustrated in FIGS. 19A to 19C, an action guide rail 182 serving as the action guide portion may be formed in lieu of the action grooves 118 and 175 in a guide plate 181 serving as the guide portion. The action guide rail 182, which is shaped to form a narrow opening 182*b* between a pair of sidewalls 182*a*, extends continuously in a direction in which a collar 183 is guided in order to support the angle 114. The collar 183 includes a main body portion 184 having the shape of a square frame, a coupling shaft portion 185, and a disk-shaped insertion portion 186. The angle 114 is inserted through the main body portion 184. The coupling shaft portion 185 is formed integrally with the main body portion 184, and the coupling shaft portion 185 has a diameter corresponding to the width of the opening 182*b* in the action guide rail 182. The insertion portion 186, which serves as a coupling portion, has a diameter that is larger than the coupling shaft portion 185 and is formed integrally with the coupling shaft portion 185. The insertion portion 186 is inserted into the action guide rail 182. The insertion portion 186 is inserted into the action guide rail 182 so that the collar 183 (main body portion 184) moves along the rail 182. A plurality of longitudinal grooves 184*b* are formed in the inner surface of a support hole 184*a* to decrease the area of contact with the angle 114 and reduce frictional resistance. The plurality of longitudinal grooves 184*b* extended in the direction in which the support hole 184*a* extends. The support hole 184*a* is arranged in the square-frame-shaped main body portion 184, and the angle 114 is inserted into and supported by the support hole 184*a*.

Figure 20A:
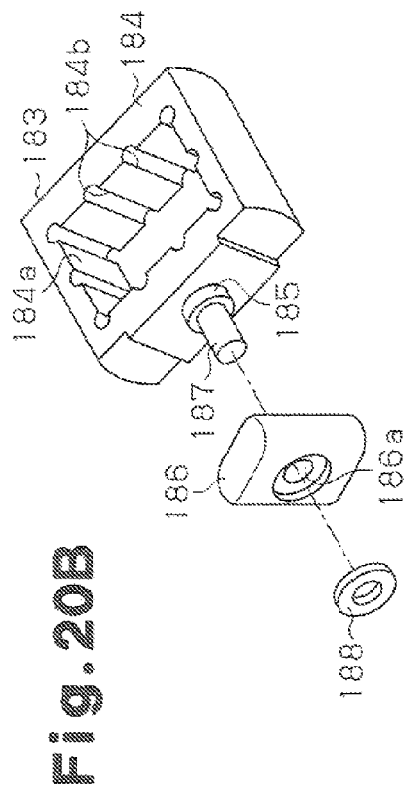
FIGS. 20A and 20B are views illustrating the connection of a guide plate and a collar in a further example.
Figure 20B:
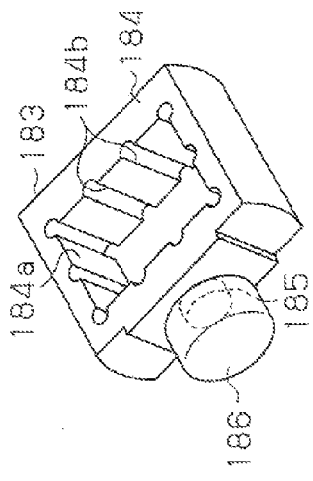

In the form illustrated in FIGS. 20A and 20B, the main body portion 184 and the insertion portion 186 of the collar 183 are discrete bodies (the coupling shaft portion 185 is arranged on the main body portion 184), an engagement pin 187 projecting from the coupling shaft portion 185 is inserted into an engagement hole 186*a* of the insertion portion 186 (formed to have a box-like shape). A washer 188 is attached to the insertion portion 186.

Figure 21A:
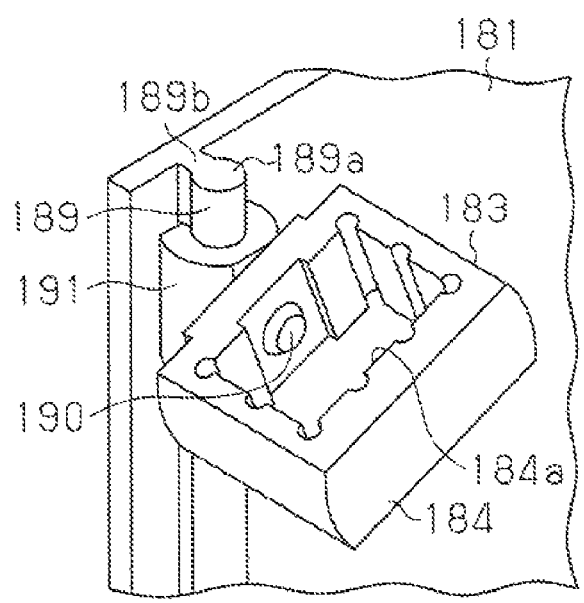
FIGS. 21A and 21B are views illustrating the connection of a guide plate and a collar in a further example.
Figure 21B:
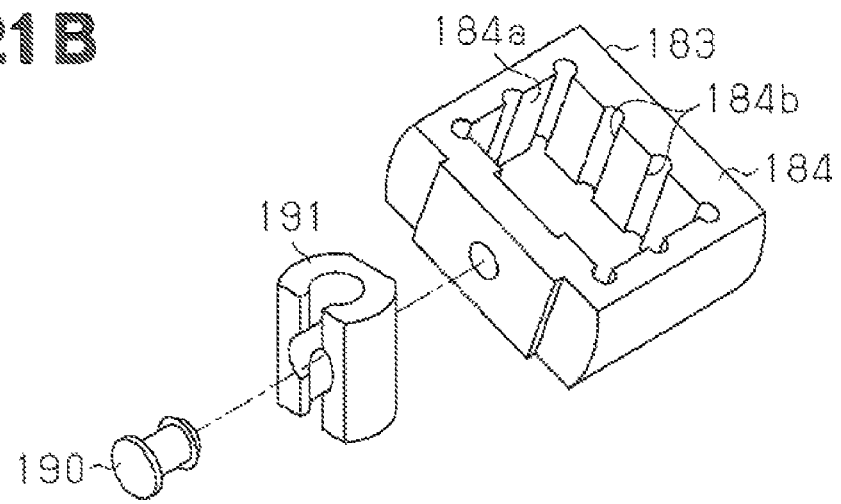

In the form illustrated in FIGS. 21A and 21B, an action guide rail 189 serving as an action guide portion is formed in lieu of the action guide rail 182 on the guide plate 181. The action guide rail 189 includes a rail main body portion 189*a* having a circular cross-section and a narrowed portion 189*b* that supports the rail main body portion 189*a*. The main body portion 184 of the collar 183 is coupled to a grasp coupling portion 191 serving as the coupling portion by a pin 190, and the grasp coupling portion 191 is coupled so as to grasp the rail main body portion 189*a*. The grasp coupling portion 191 grasps the rail main body portion 189*a* so that the collar 183 (the main body portion 184) moves along the rail 189.

In the forms illustrated in FIGS. 19A to 21B, in the same manner as with the first to the fourth embodiments which include a groove, engagement is established with a simple structure.

FIGS. 19A to 21B illustrate the modifications of the engagement structure of the action grooves 118 and 175. The modifications may be applied to the intermediate grooves 117 and 174 and the actuation grooves 116 and 173. The modifications may also be applied to the first and second embodiments.

In the first and second embodiments, the auxiliary mechanisms 11 and 61 are arranged in the seat back 4. However, the present invention is not limited in such a manner. For example, the auxiliary mechanisms 11 and 61 may be arranged between the seat back 4 and the sidewall 5*a* of the passenger compartment. In the same manner, in the third and fourth embodiments, the auxiliary mechanisms 111 and 171 do not have to be arranged in the seat back 4.

In each of the above-described embodiments, the auxiliary mechanisms 11, 61, 111, and 171 are arranged in correspondence with the rear seat. However, the auxiliary mechanisms 11, 61, 111, and 171 may be arranged in correspondence with the front seat of the vehicle.

The first and second embodiments may be applied to the vehicle seat of the third and fourth embodiments in which the winding device of the seat belt apparatus is integrally arranged in the vehicle seat to draw the webbing 6 from the inside of the seat back 4. Further, the third and fourth embodiments may be applied to the vehicle seat illustrated in the first and second embodiments in which the winding device of the seat belt apparatus is arranged outside the vehicle seat to draw the webbing 6 from the through-anchor arranged in the upper portion 4a of the seat back 4.

What is claimed is:

1. An auxiliary mechanism for a seat belt apparatus including a belt-like webbing, which is drawn out from near an upper portion of a seat back of a vehicle seat so as to restrain a passenger seated on the vehicle seat, a tongue plate, which is arranged on the webbing so as to be movable along a longitudinal direction of the webbing, and a buckle, which is engaged with the tongue plate, the auxiliary mechanism comprising:
   a support portion which supports the webbing above the tongue plate so that the webbing is drawable toward the front of the seat back along a longitudinal direction of the webbing, in which the support portion is movable between a storage position located near the seat back and a projection position spaced further apart from the seat back than the storage position to draw out the webbing toward the front of the seat back; and
   a guide portion fixed to the inside of the seat back and coupled with the support portion, the guide portion guiding the movement of the support portion between the storage position and the projection position and then continuously guiding the movement of the support portion along a vertical direction of the seat back at the storage position,
   wherein the support portion includes:
      an angle coupled to the guide portion so as to be movable relative to the guide portion; and
      a support member arranged on a distal portion of the angle to drawable support the webbing;
   wherein the guide portion includes:
      a guide plate including an actuation guide portion which has an adjustment actuation portion and an assistance actuation portion, an intermediate guide portion, which has an adjustment intermediate portion and an assistance intermediate portion,
      the adjustment actuation portion extending so as to follow undulations on a front surface of the seat back, the assistance actuation portion extending continuously from the adjustment actuation portion,
      the adjustment intermediate portion being shaped identically to the adjustment actuation portion and spaced from the adjustment actuation portion by a first predetermined distance so that the angle moves while keeping the posture of the angle in a state where the support portion is located in the storage position, and
      the assistance intermediate portion extending continuously from the adjustment intermediate portion and spaced from the assistance actuation portion; and
   wherein an actuation engagement member is movable in the direction the actuation guide portion extends and is engaged with the actuation guide portion;
   an intermediate engagement member is movable in the direction the intermediate guide portion extends and engaged with the intermediate guide portion;
   the actuation engagement member and the intermediate engagement member are fixed to a basal portion of the angle in a state spaced apart from each other by the first predetermined distance to couple the guide plate and the angle.

2. The auxiliary mechanism according to claim 1, wherein:
   the guide plate includes an action guide portion spaced from the adjustment actuation portion by a second predetermined distance, which is greater than the first predetermined distance, with the action guide portion being shaped identically to the adjustment actuation portion, and the intermediate guide portion being located between the action guide portion and the actuation guide portion so as to allow the angle to move while keeping the posture of the angle in a state where the support portion is located in the storage position;
   a coupling portion movable in the direction the action guide portion extends is engaged with the action guide portion, with the coupling portion being movable in a longitudinal direction of the angle, and the coupling portion coupling the guide plate and the angle.

3. The auxiliary mechanism according to claim 2, wherein a slit is formed between the distal portion and the basal portion of the angle, and the coupling portion includes an action engagement member engaged with the action guide portion and the slit so as to be movable in the directions the action guide portion and the slit extend.

4. The auxiliary mechanism according to claim 2, wherein the coupling portion includes a collar having a frame-shaped main body portion, which is movable in the longitudinal direction of the angle, and an action engagement portion, which extends from the main body portion and is engaged with the action guide portion so as to be movable in the direction the action guide portion extends.

5. The auxiliary mechanism according to claim 1, wherein the actuation guide portion includes an additional assistance portion inclined toward the intermediate guide portion in the direction it extends and extended more than the intermediate guide portion toward an upper side of the guide plate.

6. The auxiliary mechanism according to claim 1, wherein each of the guide portions is a groove, and each of the engagement members is a pin member inserted into the groove.

7. The auxiliary mechanism according to claim 1, wherein the support member includes an insertion hole through which the webbing is inserted.

8. The auxiliary mechanism according to claim 7, wherein the support member includes a first wall portion and a second wall portion arranged along a thicknesswise direction of the webbing, and an inlet extends through either one of the first wall portion and the second wall portion in a thicknesswise direction of the webbing and a longitudinal direction of the webbing.

9. The auxiliary mechanism according to claim 1, further comprising:
   a lever cooperatively operated with the angle, wherein when the lever is moved, movement of the support member between the storage position and the projection position and movement of the support member in the vertical direction of the seat back at the storage position are continuously performed.

10. The auxiliary mechanism according to claim 1, further comprising:
    a slide nut cooperatively operated with the angle;
    a screw shaft to which the slide nut is engaged, the screw shaft being arranged in correspondence with the guide plate;
    a motor which rotates the screw shaft; and
    a controller which controls and drives the motor;
    wherein when the motor is driven, movement of the support member between the storage position and the projection position and movement of the support member in the vertical direction of the seat back at the storage position are continuously performed.

11. The auxiliary mechanism according to claim 10, wherein a spaced distance between the actuation guide portion of the guide plate and the screw shaft changes along an axial direction of the screw shaft, the auxiliary mechanism further comprising:

a joint which couples a basal portion of the angle and the slide nut so as to absorb changes in the spaced distance between the basal portion of the angle and the slide nut in accordance with vertical movement of the slide nut.

12. The auxiliary mechanism according to claim 10, wherein the controller moves the support portion to the projection position when determining that the passenger is seated on the vehicle seat and a door is closed based on a detection result of a seating detection unit, which detects whether or not the passenger is seated on the vehicle seat, and a detection result of a door opening and closing detection unit, which detects whether or not the door of the vehicle is closed.

13. The auxiliary mechanism according to claim 10, wherein the controller moves the support portion to the storage position when determining that the passenger has fastened the seat belt apparatus based on a detection result of a seat belt fastening detection unit, which detects whether or not the passenger has fastened the seat belt apparatus.

14. An auxiliary mechanism for a seat belt apparatus including a belt-like webbing, which is drawn out from near an upper portion of a seat back of a vehicle seat so as to restrain a passenger seated on the vehicle seat, a tongue plate, which is arranged on the webbing so as to be movable along a longitudinal direction of the webbing, and a buckle, which is engaged with the tongue plate, the auxiliary mechanism comprising:

a support portion which supports the webbing above the tongue plate so that the webbing is drawable toward the front of the seat back along a longitudinal direction of the webbing, in which the support portion is movable between a storage position located near the seat back and a projection position spaced further apart from the seat back than the storage position to draw out the webbing toward the front of the seat back; and a guide portion fixed to the inside of the seat back and coupled with the support portion, the guide portion guiding the movement of the support portion between the storage position and the projection position and then continuously guiding the movement of the support portion along a vertical direction of the seat back at the storage position, wherein:

the support portion includes:

an angle which is coupled to the guide portion so as to be movable relative to the guide portion; and a support member which is arranged at a distal portion of the angle to drawably support the webbing;

the guide portion includes:

a guide plate including an actuation guide portion, which extends linearly, and an intermediate guide portion, which has a parallel portion and a nonparallel portion, with the parallel portion being spaced from the actuation guide portion by a predetermined distance and extending parallel to the actuation guide portion, and the nonparallel portion extending continuously from the parallel portion spaced from the actuation guide portion;

wherein an actuation engagement member is movable in the direction the actuation guide portion extends and engaged with the actuation guide portion;

an intermediate engagement member is movable in the direction the intermediate guide portion extends and engaged with the intermediate guide portion;

the actuation engagement member and the intermediate engagement member are fixed to a basal portion of the angle in a state spaced apart from each other by a distance that is greater than the predetermined distance to couple the guide plate and the angle.

15. The auxiliary mechanism according to claim 14, wherein:

the guide plate includes an action guide portion extended parallel to the actuation guide portion, in which the intermediate guide portion is located between the action guide portion and the actuation guide portion;

a coupling portion movable in the direction the action guide portion extends is engaged with the action guide portion, with the coupling portion being movable in a longitudinal direction of the angle, and the coupling portion coupling the guide plate and the angle.

16. The auxiliary mechanism according to claim 15, wherein a slit is formed between the distal portion and the basal portion of the angle, and the coupling portion includes an action engagement member engaged with the action guide portion and the slit so as to be movable in the directions the action guide portion and the slit extend.

17. The auxiliary mechanism according to claim 15, wherein the coupling portion includes a collar having a frame-shaped main body portion, which is movable in the longitudinal direction of the angle, and an action engagement portion, which extends from the main body portion and is engaged with the action guide portion so as to be movable in the direction the action guide portion extends.

18. The auxiliary mechanism according to claim 14, wherein the actuation guide portion includes an additional assistance portion inclined toward the intermediate guide portion in the direction it extends and extended more than the intermediate guide portion toward an upper side of the guide plate.

19. The auxiliary mechanism according to claim 14, wherein each of the guide portions is a groove, and each of the engagement members is a pin member inserted into the groove.

20. The auxiliary mechanism according to claim 14, wherein the support member includes an insertion hole through which the webbing is inserted.

21. The auxiliary mechanism according to claim 20, wherein the support member includes a first wall portion and a second wall portion arranged along a thicknesswise direction of the webbing, and an inlet extends through either one of the first wall portion and the second wall portion in a thicknesswise direction of the webbing and a longitudinal direction of the webbing.

22. The auxiliary mechanism according to claim 14, further comprising:

a lever cooperatively operated with the angle, wherein when the lever is moved, movement of the support member between the storage position and the projection position and movement of the support member in the vertical direction of the seat back at the storage position are continuously performed.

23. The auxiliary mechanism according to claim 14, further comprising:

a slide nut cooperatively operated with the angle;

a screw shaft to which the slide nut is engaged, the screw shaft being arranged in correspondence with the guide plate;

a motor which rotates the screw shaft; and a controller which controls and drives the motor;

wherein when the motor is driven, movement of the support member between the storage position and the projection position and movement of the support member in the vertical direction of the seat back at the storage position are continuously performed.

24. The auxiliary mechanism according to claim 23, wherein a spaced distance between the actuation guide portion of the guide plate and the screw shaft changes along an axial direction of the screw shaft, the auxiliary mechanism further comprising:
- a joint which couples a basal portion of the angle and the slide nut so as to absorb changes in the spaced distance between the basal portion of the angle and the slide nut in accordance with vertical movement of the slide nut.

25. The auxiliary mechanism according to claim 23, wherein the controller moves the support portion to the projection position when determining that the passenger is seated on the vehicle seat and a door is closed based on a detection result of a seating detection unit, which detects whether or not the passenger is seated on the vehicle seat, and a detection result of a door opening and closing detection unit, which detects whether or not the door of the vehicle is closed.

26. The auxiliary mechanism according to claim 23, wherein the controller moves the support portion to the storage position when determining that the passenger has fastened the seat belt apparatus based on a detection result of a seat belt fastening detection unit, which detects whether or not the passenger has fastened the seat belt apparatus.

* * * * *